US012353227B2

(12) United States Patent
Wales et al.

(10) Patent No.: US 12,353,227 B2
(45) Date of Patent: Jul. 8, 2025

(54) METERED DISPENSE INPUT DEVICE

(71) Applicant: Delta Faucet Company, Indianapolis, IN (US)

(72) Inventors: Joshua Wales, Indianapolis, IN (US); Joel D. Sawaski, Indianapolis, IN (US); Anthony G. Spangler, Indianapolis, IN (US); Kent Rittenhouse, Holland, OH (US)

(73) Assignee: Delta Faucet Company, Indianapolis, IN (US)

( * ) Notice: Subject to any disclaimer, the term of this patent is extended or adjusted under 35 U.S.C. 154(b) by 0 days.

(21) Appl. No.: 18/648,945

(22) Filed: Apr. 29, 2024

(65) Prior Publication Data

US 2024/0272657 A1  Aug. 15, 2024

Related U.S. Application Data

(63) Continuation of application No. 16/571,893, filed on Sep. 16, 2019, now Pat. No. 12,055,958.
(Continued)

(51) Int. Cl.
*G05D 23/13* (2006.01)
*E03C 1/05* (2006.01)
(Continued)

(52) U.S. Cl.
CPC ......... *G05D 23/1353* (2013.01); *E03C 1/057* (2013.01); *F16K 31/0603* (2013.01);
(Continued)

(58) Field of Classification Search
CPC ... G05D 7/018; F16K 19/006; F16K 31/0675; F16K 31/041; F16K 31/055; F16K 37/0041; F16K 27/003
See application file for complete search history.

(56) References Cited

U.S. PATENT DOCUMENTS 3,721,386 A * 3/1973 Brick ................. G05D 23/1393
236/12.12
7,150,293 B2 12/2006 Jonte
(Continued)

FOREIGN PATENT DOCUMENTS

CN        2048547      11/1989
CN      201090780       7/2008
(Continued)

OTHER PUBLICATIONS

American Standard, specsheet 4931360, © 2017 AS America Inc., 2 pages.
(Continued)

*Primary Examiner* — Nelson J Nieves
*Assistant Examiner* — Meraj A Shaikh
(74) *Attorney, Agent, or Firm* — Bose McKinney & Evans LLP

(57) ABSTRACT

The present disclosure relates to a metered dispense input device that wirelessly communicates with a wireless control module of an electronic faucet to allow wireless control of the faucet such that selected volumes of water can be dispensed. The present disclosure further relates to a metered dispense input device that is integrated into an electronic faucet to allow the dispensing of selected volumes of water.

19 Claims, 21 Drawing Sheets

Related U.S. Application Data

(60) Provisional application No. 62/732,486, filed on Sep. 17, 2018.

(51) Int. Cl.
  *F16K 31/06* (2006.01)
  *G01G 17/06* (2006.01)
  *G04B 19/16* (2006.01)
  *E03C 1/04* (2006.01)

(52) U.S. Cl.
  CPC ............. *G01G 17/06* (2013.01); *G04B 19/16* (2013.01); *G05D 23/1393* (2013.01); *E03C 2001/0418* (2013.01)

(56) References Cited

U.S. PATENT DOCUMENTS

| | | |
|---|---|---|
| 7,306,115 B2 | 12/2007 | Beachy |
| 7,458,520 B2 | 12/2008 | Belz et al. |
| 7,537,023 B2 | 5/2009 | Marty et al. |
| 7,690,195 B2 | 4/2010 | Jonte et al. |
| 7,837,063 B2 | 11/2010 | Stoddard |
| 7,979,928 B2 | 7/2011 | Allen, Jr. et al. |
| 7,997,301 B2 | 8/2011 | Marty et al. |
| 8,127,967 B1 | 3/2012 | Beachy |
| 8,403,179 B1 | 3/2013 | Gerber |
| 8,820,705 B2 | 9/2014 | Davidson et al. |
| RE45,373 E | 2/2015 | Allen, Jr. et al. |
| 8,950,730 B2 | 2/2015 | Bedolla et al. |
| 9,009,883 B2 | 4/2015 | Chase et al. |
| 9,139,987 B2 | 9/2015 | Bedolla et al. |
| 9,285,807 B2 | 3/2016 | Rodenbeck et al. |
| 9,458,612 B2 | 10/2016 | Thomas et al. |
| 9,528,249 B2 | 12/2016 | Gompper |
| 9,777,470 B2 | 10/2017 | Mazz et al. |
| 9,816,257 B2 | 11/2017 | Blake et al. |
| 9,840,832 B2 | 12/2017 | Seggio et al. |
| 9,945,103 B2 | 4/2018 | Thompson et al. |
| 10,184,232 B2 | 1/2019 | Veros et al. |
| 12,055,958 B2 | 8/2024 | Wales et al. |
| 2002/0167861 A1 | 11/2002 | Barton et al. |
| 2005/0235981 A1 | 10/2005 | Mac |
| 2007/0152074 A1 | 7/2007 | Stowe et al. |
| 2007/0246550 A1 | 10/2007 | Rodenbeck et al. |
| 2008/0277927 A1 | 11/2008 | Mueller et al. |
| 2013/0014844 A1* | 1/2013 | Davidson ............... F16K 31/02 137/625.41 |
| 2014/0345726 A1 | 11/2014 | Seggio et al. |
| 2014/0359935 A1* | 12/2014 | Veros .................. E03C 1/055 4/677 |
| 2015/0322652 A1* | 11/2015 | Mazz .................. G05D 7/0623 137/583 |
| 2016/0214041 A1 | 7/2016 | Miller et al. |
| 2016/0289932 A1 | 10/2016 | Mirakhimov et al. |
| 2016/0362877 A1* | 12/2016 | Thomas ............... E03C 1/0404 |
| 2017/0068257 A1 | 3/2017 | Quinones |
| 2017/0101766 A1 | 4/2017 | Blizzard et al. |
| 2017/0121952 A1 | 5/2017 | Hong et al. |
| 2017/0219115 A1 | 8/2017 | Hong et al. |
| 2017/0260722 A1 | 9/2017 | Horwitz et al. |
| 2018/0355592 A1 | 12/2018 | Mandel |
| 2019/0264427 A1 | 8/2019 | Chung |
| 2021/0062484 A1 | 3/2021 | Wales et al. |

FOREIGN PATENT DOCUMENTS

| | | |
|---|---|---|
| CN | 102844501 | 12/2012 |
| CN | 204756129 | 11/2015 |
| CN | 105782551 | 7/2016 |
| CN | 107269917 | 10/2017 |
| JP | 2007085525 | 4/2007 |
| WO | WO 2007/082301 | 7/2007 |
| WO | WO 2008/094651 | 8/2008 |
| WO | WO 2009/075858 | 6/2009 |

OTHER PUBLICATIONS

American Standard, Beale MeasureFill Touch Pull-Down Kitchen Faucet, retrieved on Dec. 29, 2019 from https://wwwq.americanstandard-us-com/kitchens/kitchen-faucets/beale-measurefill-touch-kitchen-faucet-32964, 11 page.

* cited by examiner

METERED DISPENSE INPUT DEVICE

CROSS-REFERENCE TO RELATED APPLICATION

This application is a continuation of U.S. patent application Ser. No. 16/571,893 filed on Sep. 16, 2019 which claims priority to U.S. Provisional Application Ser. No. 62/732,486 filed on Sep. 17, 2018, the disclosures of both of which are hereby incorporated by reference in their entirety.

BACKGROUND AND SUMMARY OF THE DISCLOSURE

The present disclosure relates generally to a fluid delivery apparatus and, more particularly, to a faucet including a metered dispense input device.

Electronic faucets typically include an electrically operable valve coupled to an electronic controller for controlling fluid flow through a water outlet. Some electronic faucets include proximity sensors, such as active infrared ("IR") proximity detectors or capacitive proximity sensors to control operation of the electrically operable valve. Such proximity sensors may be used to detect a user's hands positioned near the faucet and to automatically start fluid flow through the faucet in response to detection of the user's hands. Other electronic faucets may use touch sensors, such as capacitive touch sensors, to control the faucet. An illustrative electronic faucet is detailed in U.S. Patent Application Publication No. 2016/0362877 to Thomas et al., the disclosure of which is expressly incorporated herein by reference.

The present disclosure relates to a metered dispense input device that wirelessly communicates with a wireless control module of an existing electronic faucet to allow wireless control of the faucet such that precise volumes of water can be dispensed. The present disclosure further relates to a metered dispense input device that is integrated into an electronic faucet to allow the dispensing of precise volumes of water.

According to an illustrative embodiment of the present disclosure, a metered dispense input unit includes a shell defining a chamber, and an input controller disposed within the chamber and configured to communicate with an electrically operable valve of a faucet. A rotatable first dial is supported by the shell and is operably coupled to the input controller, wherein the rotational position of the first dial selects one of a plurality of values corresponding with a numerical unit. A rotatable second dial is supported by the shell and is operably coupled to the input controller, wherein the rotational position of the second dial selects one of a second plurality of values corresponding with a fluid serving size. An activation button is positioned above the first dial and is in communication with the input controller, the activation button operably coupled to the first dial and the second dial, wherein actuation of the activation button communicates the values selected by the first dial and the second dial to the input controller for dispensing a volume of fluid defined by the numerical unit selected by the first dial and the fluid serving size selected by the second dial.

According to another illustrative embodiment of the present disclosure, a metered dispense input unit includes a shell defining a chamber, at least one magnet supported by the shell, a rotatable first dial supported by the shell, and a rotatable second dial supported by the shell. The rotational position of the first dial selects one of a first plurality of values corresponding with a numerical unit. The rotational position of the second dial selects one of a second plurality of values corresponding with a fluid serving size. An activation button is positioned above the first dial, the activation button operably coupled to the first dial and the second dial. An anchor extends below the shell, wherein the anchor includes at least one magnet, the at least one magnet of the anchor and the at least one magnet of the shell configured to couple to each other.

According to a further illustrative embodiment of the present disclosure, a metered dispense input unit for a faucet includes a shell defining a chamber, and an input controller disposed within the chamber, including a potentiometer and configured to communicate with a faucet. A power supply is disposed within the chamber, the power supply configured to power the metered dispense input unit. A rotatable first dial is positioned above the shell, wherein rotation of the first dial facilitates selection of one of a plurality of values corresponding with a numerical unit. A rotatable second dial is supported by the shell, wherein rotation of the second dial facilitates selection of one of a second plurality of values corresponding with a fluid serving size. An activation button is positioned above the first dial, the activation button operably coupled to the first dial and the second dial, wherein actuation of the activation button places the input controller in operation to communicate the selected values to the faucet. A mount is operably coupled to the shell.

According to another illustrative embodiment of the present disclosure, a faucet includes a metered dispense input unit having a shell defining a chamber, and an input controller disposed within the chamber. A rotatable first dial is supported by the shell and is operably coupled to the input controller, wherein the rotational position of the first dial selects one of a first plurality of values corresponding with a numerical unit. A rotatable second dial is supported by the shell and is operably coupled to the input controller, wherein the rotational position of the second dial selects one of a second plurality of values corresponding with a fluid serving size. An activation button is positioned above the first dial, the activation button operably coupled to the input controller. An electrically operable valve is operably coupled to the metered dispense unit. A control module is in communication with the input controller and is configured to control operation of the electrically operable valve.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF DRAWINGS

A detailed description of the drawings particularly refers to the accompanying figures, in which.

DETAILED DESCRIPTION OF THE DRAWINGS

Figure 1:
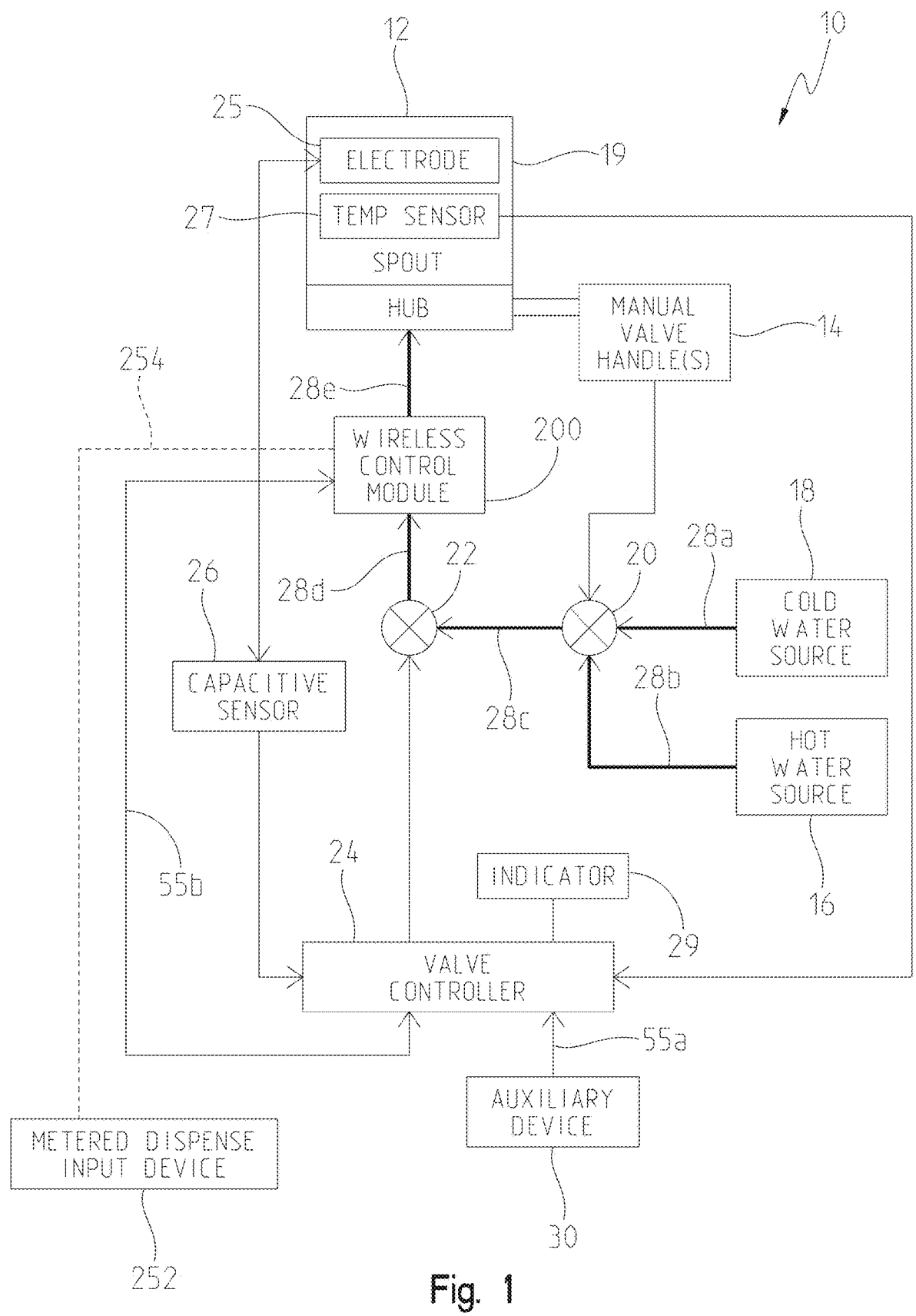
FIG. 1 is a block diagram illustrating an exemplary electronic faucet of the present disclosure.

For the purposes of promoting an understanding of the principles of the present disclosure, reference will now be made to the embodiments illustrated in the drawings, which are described herein. The embodiments disclosed herein are not intended to be exhaustive or to limit the invention to the precise form disclosed. Rather, the embodiments are chosen and described so that others skilled in the art may utilize their teachings. Therefore, no limitation of the scope of the claimed invention is thereby intended. The present invention includes any alterations and further modifications of the illustrated devices and described methods and further applications of principles in the invention which would normally occur to one skilled in the art to which the invention relates.

The present disclosure relates to a metered dispense input device that communicates with a control module of an electronic faucet to allow control of the faucet such that precise volumes of water can be dispensed. In an illustrative embodiment, the metered dispense input device wirelessly communicates with the control module to dispense water from the faucet. In another illustrative embodiment, the metered dispense input device is integrated into the faucet.

Referring initially to FIG. 1, a block diagram of an electronic faucet 10 is shown according to some illustrative embodiments of the present disclosure. The electronic faucet 10 includes a spout 12 supporting a passageway or fluid conduit for delivering fluids such as water, for example. The passageway of the spout 12 may include fluid passages 28 between a hot water source 16, a cold water source 18, and a water outlet 19 of the spout 12. See, for example, passages 28a, 28b, 28c, 28d, 28e of FIG. 1, which may comprise flexible tubes made of a polymer (e.g., cross-linked polyethylene (PEX)).

The electronic faucet 10 illustratively includes an electrically operable valve, such as a solenoid valve 22, in fluid communication with the hot water source 16 and the cold water source 18. The solenoid valve 22 is illustratively controlled electronically by a valve controller 24. In an illustrative embodiment, the valve controller 24 is configured to open and close the solenoid valve 22 to turn on and off the fluid flow to the outlet 19 of the spout 12. In another illustrative embodiment, the valve controller 24 may be further configured to proportionally control the solenoid valve 22 to adjust the flow rate and/or temperature of the fluid flowing through the spout 12. In an illustrative embodiment, the solenoid valve 22 may comprise a pilot operated solenoid valve, although another suitable electrically operable or actuator driven valves may be provided, such as an electronically proportional valve (EPV). Additional details of the solenoid valve 22 is further provided in U.S. Pat. No. 9,458,612, the disclosure of which is expressly incorporated herein by reference.

The illustrative valve controller 24 may control the solenoid valve 22 based on output from at least one activation sensor, such as a proximity sensor and/or a touch sensor, for example. The activation sensor may comprise a capacitive sensor 26 in communication with the valve controller 24 for providing signals to the valve controller 24 indicating the detection of an object, such as a user's hands, on or near spout 12. Other suitable activation sensors may be utilized, such as infrared (IR) sensors, manual toggle switches, push buttons, etc.

As illustrated in FIG. 1, an electrode 25 of the capacitive sensor 26 is coupled to the spout 12 to detect an object contacting the spout 12. The electrode 25 may be positioned elsewhere on faucet 10 for detecting the presence of a user's hands. The capacitive sensor 26 and the electrode 25 may be utilized for either a touch mode of operation, a hands-free mode of operation, or a combined touch and hands-free mode of operation. In the hands-free mode of operation, the capacitive sensor 26 and the valve controller 24 detect a user's hands or other object within a detection area or zone near the spout 12. In one embodiment, the detection area includes the water stream discharged from the outlet 19 and the area in the sink basin immediately surrounding the water stream. The detection area may be expanded to other areas depending on the location and sensitivity of the capacitive sensor 26. In the touch mode of operation, the capacitive sensor 26 and the valve controller 24 detect a user's hands or other object upon contact with a surface of the spout 12 (or other designated component of the faucet 10). To turn on the faucet 10 in either mode, the solenoid valve 22 is activated by the valve controller 24 upon detecting the object (e.g., the user's hands) to toggle water flow on and off.

In some illustrative embodiments, by sensing capacitance changes with the capacitive sensor 26, the valve controller 24 is configured to make logical decisions to control different modes of operation of the faucet 10 such as changing between a manual mode of operation and a hands free mode of operation as described in U.S. Pat. Nos. 7,537,023; 7,690,395; 7,150,293; 7,997,301; and PCT International Patent Application Publication Nos. WO 2008/094651 and WO 2009/075858, the disclosures of which are all expressly incorporated herein by reference.

Still referring to FIG. 1, in one illustrative embodiment, the water temperature and the water flow rate may be manipulated by manual adjustment of a manual valve handle 14 operably coupled to a manual valve assembly 20. As the manual valve handle 14 is adjusted, the manual valve assembly 20 positioned in the passageway of the spout 12 may correspondingly adjust the temperature and/or flow of fluid from the hot water source 16 and the cold water source 18 to the solenoid valve 22. A separate manual valve handle 14 may be provided for each of the hot water source 16 and the cold water source 18. In other illustrative embodiments, the electronic faucet 10 is a fully automatic faucet without the manual valve handle(s) 14 or the manual valve assembly 20. An illustrative manual valve assembly 20 is detailed in U.S. Pat. No. 7,753,074, the disclosure of which is expressly incorporated herein by reference.

The valve controller 24 may further control the valve assembly 20 electronically. For example, the valve assembly 20 may comprise an electrically operable valve, such as an electronic proportioning or mixing valve, that is adjusted by the valve controller 24 to control the mixture of hot and cold water and thus the temperature of the water flowing through the spout 12 to the outlet 19. Such an electronic mixing valve 20 may be in addition to, or replace, the solenoid valve 22. Additionally, the mixing valve 20 may be replaced by separate hot and cold water proportional valves. Exemplary electronically controlled mixing valves are described in U.S. Pat. No. 7,458,520 and PCT International Patent Application Publication No. WO 2007/082301, the disclosures of which are expressly incorporated herein by reference.

The amount of fluid flowing from the hot water source 16 and the cold water source 18 may be controlled by the valve controller 24 based on one or more user inputs, such as desired water temperature, desired water flow rate, desired water volume, various task based inputs, various recognized presentments, and/or combinations thereof. For example, the faucet 10 may include a temperature sensor 27 in fluid communication with the water output of the electrically operable valve 22, and thereby the water discharged from the outlet 19 of the spout 12, to provide feedback to valve controller 24 for use in controlling the water temperature. In one illustrative embodiment, the valve controller 24 controls the electrically operable valve 22 via an auxiliary port (not shown).

The temperature sensor 27 can be used to provide water at a desired temperature, or may be utilized to implement additional features of an exemplary faucet. For example, the temperature sensor 27 and the valve controller 24 may define a high temperature limit and/or a "warm-up" feature. The temperature sensor 27 illustratively provides a signal to the valve controller 24 corresponding with the temperature of the water as it flows over the temperature sensor 27. The valve controller 24 may compare feedback to the settings of the electronic faucet 10 to ensure that the water temperature does not exceed a maximum setting or to ensure the water is preheated for use, for example. In both circumstances, when a desired water temperature is reached, the valve controller 24 may turn off or close the electrically operable valve 22.

The faucet 10 may include one or more indicators 29 controlled by the valve controller 24 to provide a visual or audio indication of the operational mode (e.g., hands free and/or touch mode) and/or water temperature of the electronic faucet 10. An exemplary indicator 29 includes a light-emitting diode (LED) or other light source, or audible device positioned near the faucet 10. Other exemplary indicators 29 include a liquid crystal display (LCD) and a magnetically latching mechanical indicator. In one embodiment, the indicators 29 are operative to indicate operating mode and/or the temperature of the water flowing through the faucet 10 based on the selective illumination of different colored LED's or a single multi-colored LED. The indicator 29 may provide a color indication of water temperature (e.g., cold water represented by a blue light, and hot water represented by a red light).

The valve controller 24 may be in communication with a remote device in addition to the electronic faucet 10, illustratively an auxiliary device 30. The exemplary auxiliary device 30 may include, for example, another faucet spout, a soap dispenser, a beverage dispenser, or another suitable dispensing device. The auxiliary device 30 may be positioned adjacent the same sink basin as the spout 12. Alternatively, the auxiliary device 30 may be positioned to dispense into a different sink basin, such as another sink basin in a bathroom or kitchen or in another room, for example. The auxiliary device 30 may also comprise any of a garbage disposal, a dishwasher, an instant hot device, a remote switch (e.g., a foot switch), or other device associated with or in proximity to a plumbing device. In another illustrative embodiment, the auxiliary device 30 may alternately or additionally comprise a wireless control module 200.

While the illustrative auxiliary device 30 may be fully controlled by valve controller 24, the device 30 may also include a separate controller (e.g., microprocessor) for operating itself, while receiving power and/or communication from the controller 24.

Figure 7:
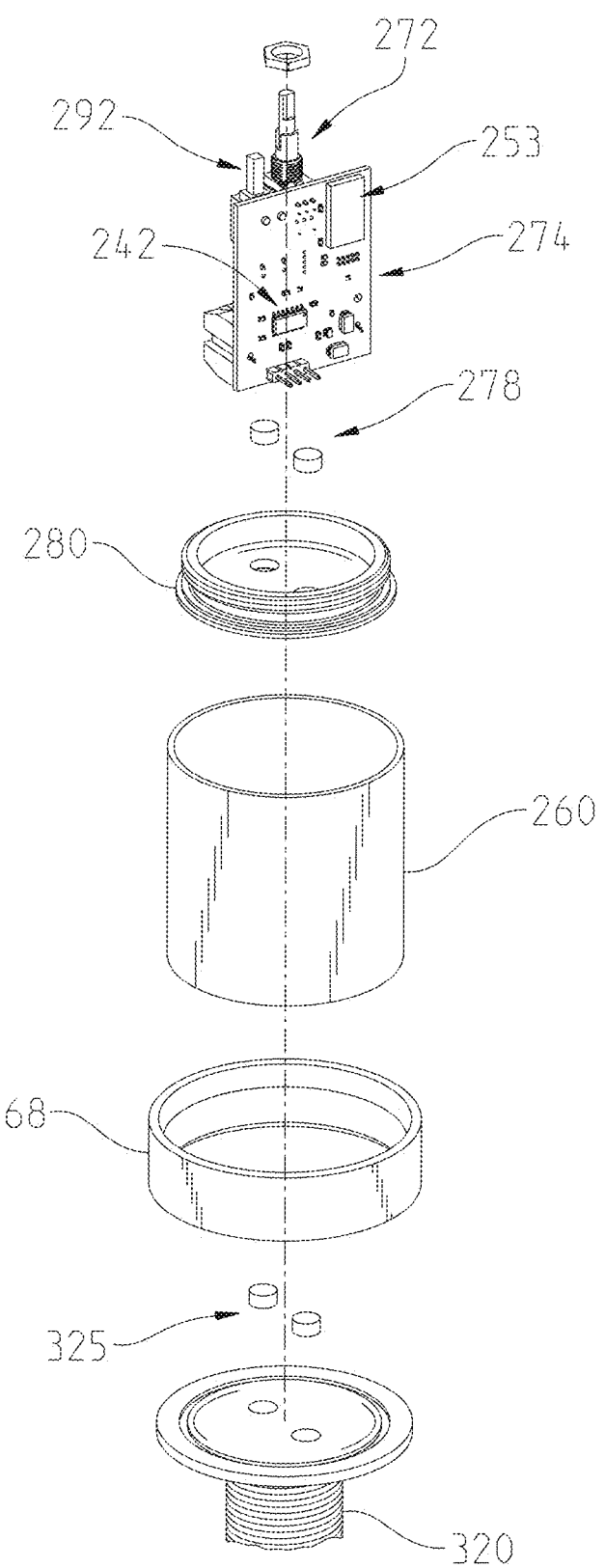
FIG. 7 is an exploded perspective view of a lower portion of the metered dispense input device shown in FIG. 6.
Figure 8:
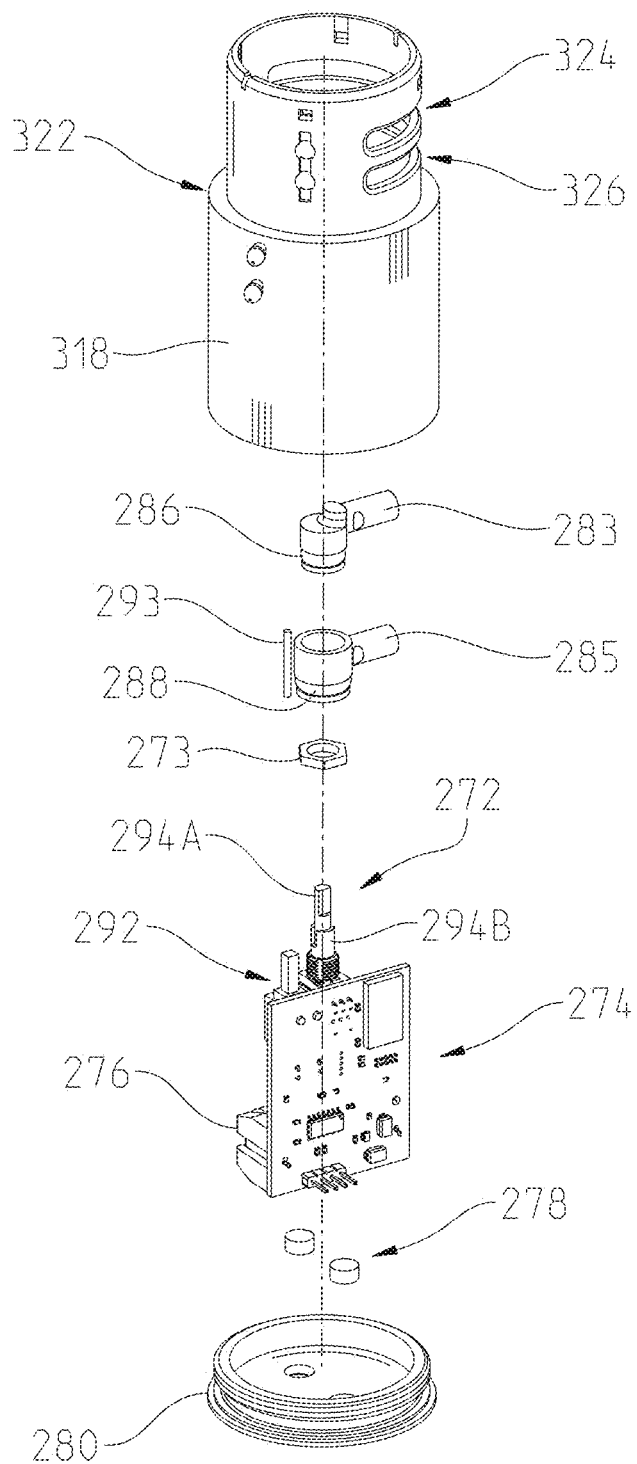
FIG. 8 is an exploded perspective view of a middle portion of the metered dispense input device shown in FIG. 6.
Figure 9:
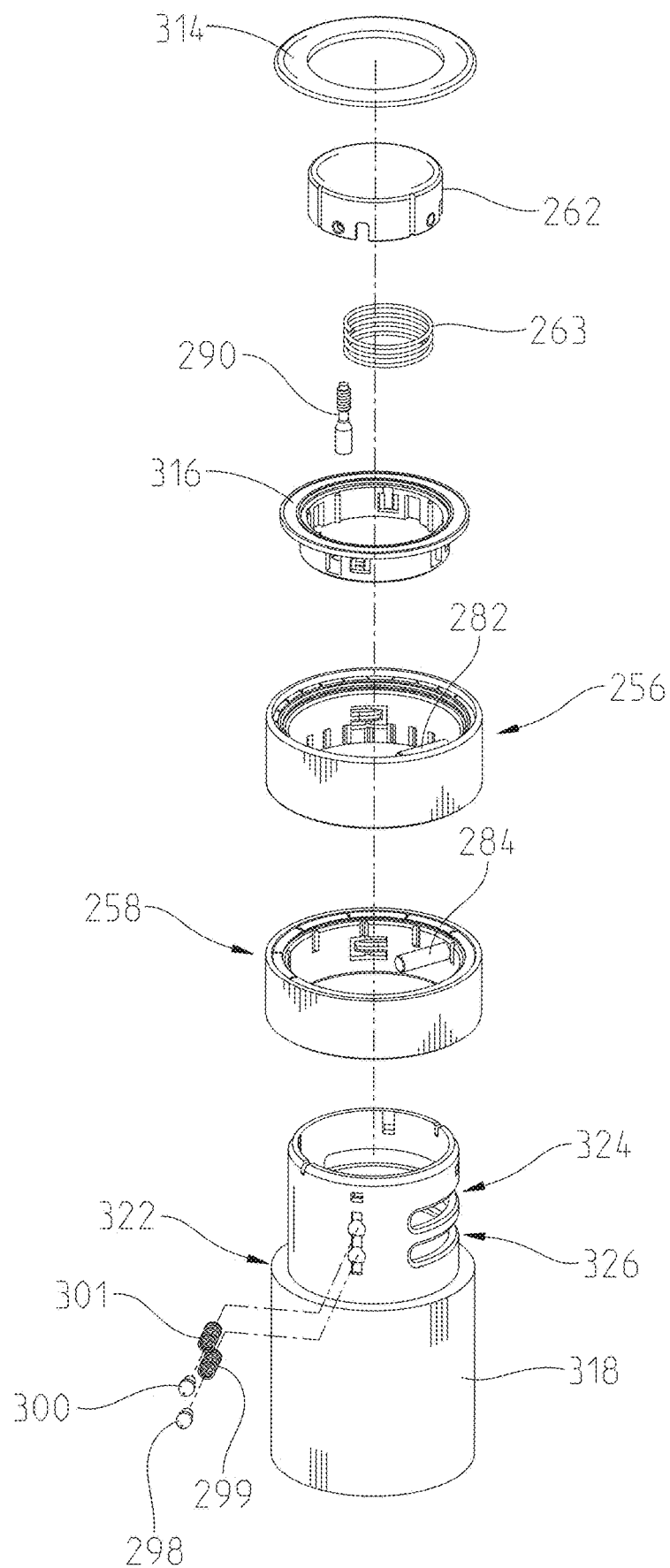
FIG. 9 is an exploded perspective view of an upper portion of the metered dispense input device of FIG. 2.

As shown in FIG. 1, a metered dispense input device 252 is illustratively in communication with the wireless control module 200. Illustratively, a wireless transceiver 253 of the metered dispense input device 252 (FIG. 7) is in wireless communication with a wireless transceiver 250 of the wireless control module 200 (FIG. 16B). In one illustrative embodiment, a wireless connection 254 between the metered dispense input device 252 and the wireless control module 200 is a Bluetooth or radio frequency (RF) connection. In another embodiment, the connection 254 is a Wi-Fi connection. However, it is within the scope of the present disclosure that alternate forms of wireless connection may be used, such as near field communication (NFC), for example. In other illustrative embodiments, a wired connection may be used between the metered dispense input device 252 and the control module 200 (or directly between the metered dispense input device 252 and the valve controller 24) such that the metered dispense input device 252 may be integrated within the electronic faucet 10. For example, the metered dispense input device 252 may comprise an auxiliary device 30 in direct communication within the valve controller 24. It should be further noted that in certain illustrative embodiments, the valve controller 24 and the wireless control module 200 may be defined by a single controller.

Referring now to FIGS. 2-14, the illustrative metered dispense input device 252 is shown in greater detail. The illustrative metered dispense input device 252 includes an activation button 262, a top shell 314, a serving quantity dial 256, a measurement units dial 258, and an outer shell 260 to house the internal components of metered dispense input device 252 further discussed herein. As further detailed herein, the rotational position of the serving quantity dial 256 selects one of a plurality of values corresponding with a numerical value or unit. The rotational position of the measurement units dial 258 selects one of a plurality of values corresponding with a fluid serving size.

The activation button 262 illustratively stands proud of the top shell 314 in a raised position, and sits in a seat 316

Figure 5:
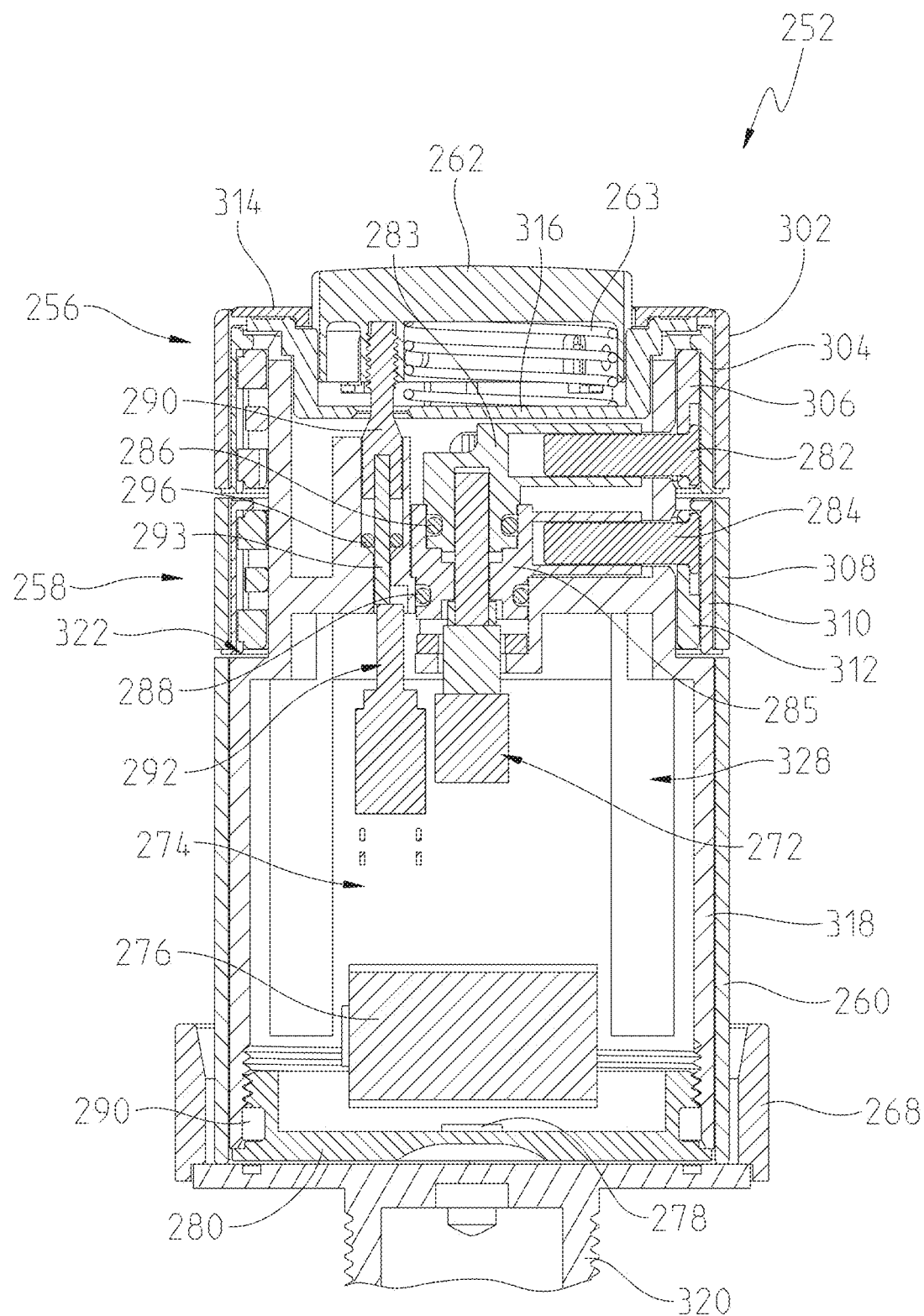
FIG. 5 is another cross-sectional view of the metered dispense input device of FIG. 2.

(FIG. 3) positioned underneath the top shell 314. The illustrative activation button 262 is also spring loaded in the seat 316 such that when activation button 262 is depressed, a spring 263 biases the activation button 262 to its original or raised position. Further, when activation button 262 is actuated (e.g., by pressing), the metered dispense input device 252 is activated via a button switch 292 (FIG. 5).

Figure 3:
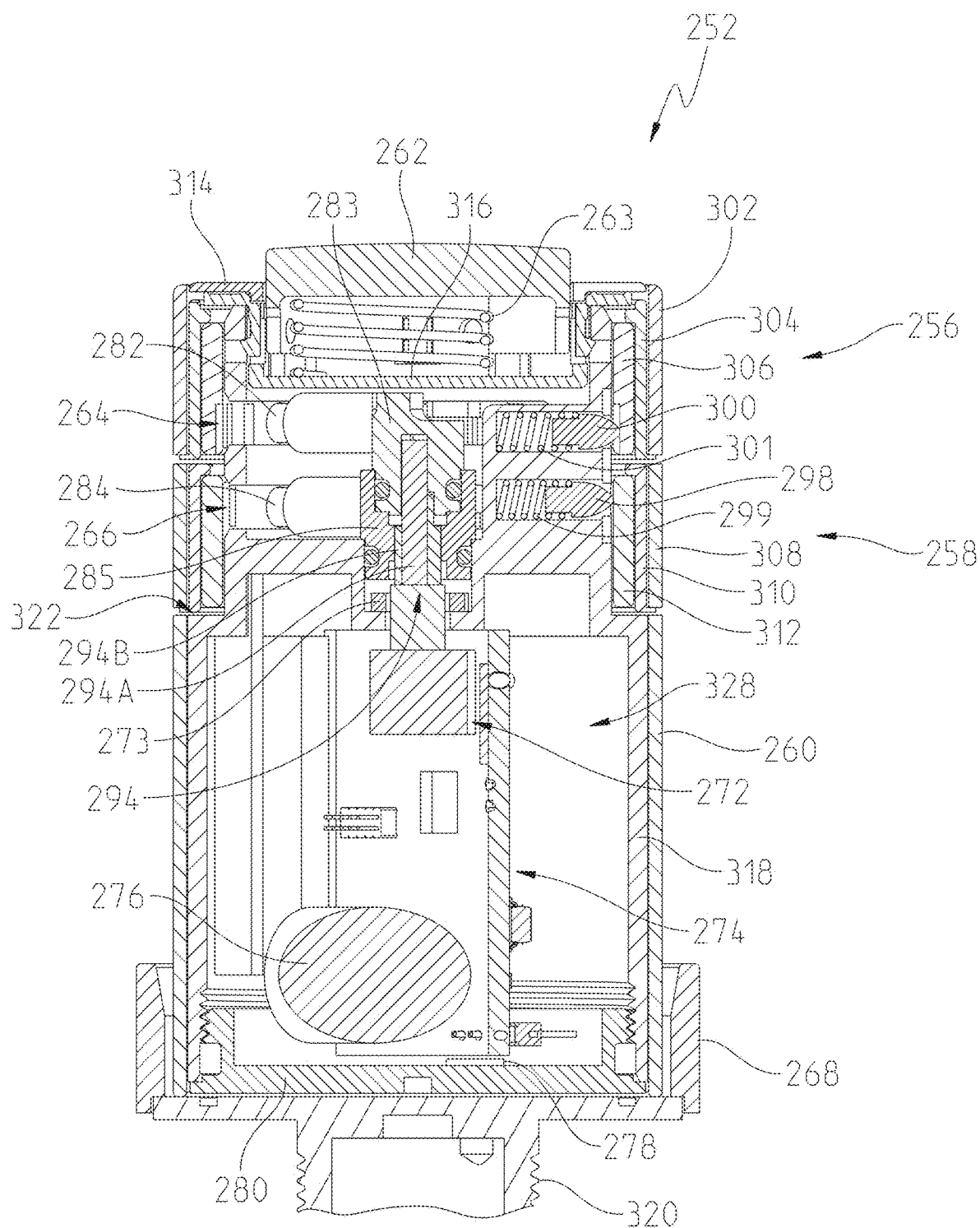
FIG. 3 is a cross-sectional view of the metered dispense input device of FIG. 2.

In an illustrative embodiment, when the activation button 262 is actuated (e.g., by pressing), the button switch 292 activates the circuitry (e.g., via communication with a power supply 276) of an input controller, illustratively a circuit card 274 (FIG. 3). A rotary sensor (e.g., a potentiometer 272) is operably coupled to a processor 242, such as a conventional microprocessor, of the circuit card 274 (FIG. 7), thereby providing information on the rotational position of the dials 256 and 258 between the metered dispense input device 252 and the faucet 10, for example, via the wireless transceiver 253 and the wireless control module 200 (FIG. 16B). In another illustrative embodiment, the activation button 262 may be activated by other input devices, such as a capacitive sensor detecting a user's touch rather than requiring depressing of the activation button 262. Further, after a period of inactivity for the metered dispense input device 252, the button switch 292 may deactivate or electrically decouple the power supply 276 of the circuit card 274 (i.e., from the potentiometer 272), such that there is no power draw into metered dispense input device 252 while the metered dispense input device 252 is nonoperational, thereby disconnecting the metered dispense input device 252 and the faucet 10. In another illustrative embodiment, the processor 242 on the circuit card 274 may enter into a sleep mode to reduce power consumption from the power supply 276.

The linkage 284 corresponds, and is operably coupled, with a quantity dial 256, and the linkage 282 corresponds with the units dial 258. The quantity dial 256 cooperates with the units dial 258 to control the quantity of liquid dispensed from the electronic faucet 10. Illustratively, the quantity dial 256 and the units dial 258 are rotatable around the circumference of the metered dispense input device 252 and utilize a detent mechanism described further herein to enable user selection of a discrete amount of liquid to be dispensed by the electronic faucet 10 in response to input from the metered dispense input device 252. The quantity dial 256 and the units dial 258 are illustratively vertically spaced from each other, and are supported for rotation about a common longitudinal axis 319 defined by the shell 318.

Specifically, the quantity dial 256 allows the user to select a discrete denomination of the liquid to be dispensed (e.g., ¼, ½, 1, 2, 3, etc.), and the units dial 258 allows the user to select the serving size of the liquid to be dispensed (e.g., cups, tablespoons, gallons, liters, etc.). For example, if a user selects a "3" on the quantity dial 256 and "tablespoons" on the units dial 258, then metered dispense input device 252 would communicate with the electronic faucet 10 such that the electronic faucet 10 dispenses three tablespoons of liquid upon actuation of the activation button 262. In one embodiment, the units dial 258 of the metered dispense input device 252 allows for at least six different units to be selectable such as tablespoons, ounces, cups, pints, quarts, and gallons. In another embodiment, a metric version of the units dial 258 could also be used. In yet another embodiment, the quantity dial 256 has quantities of ¼, ⅓, ½, ⅔, ¾, 1, 2, 3, 4, 5, 6, 7, and 8. However, it is within the scope of the present disclosure that alternate quantities and units may be used.

Figure 2A:
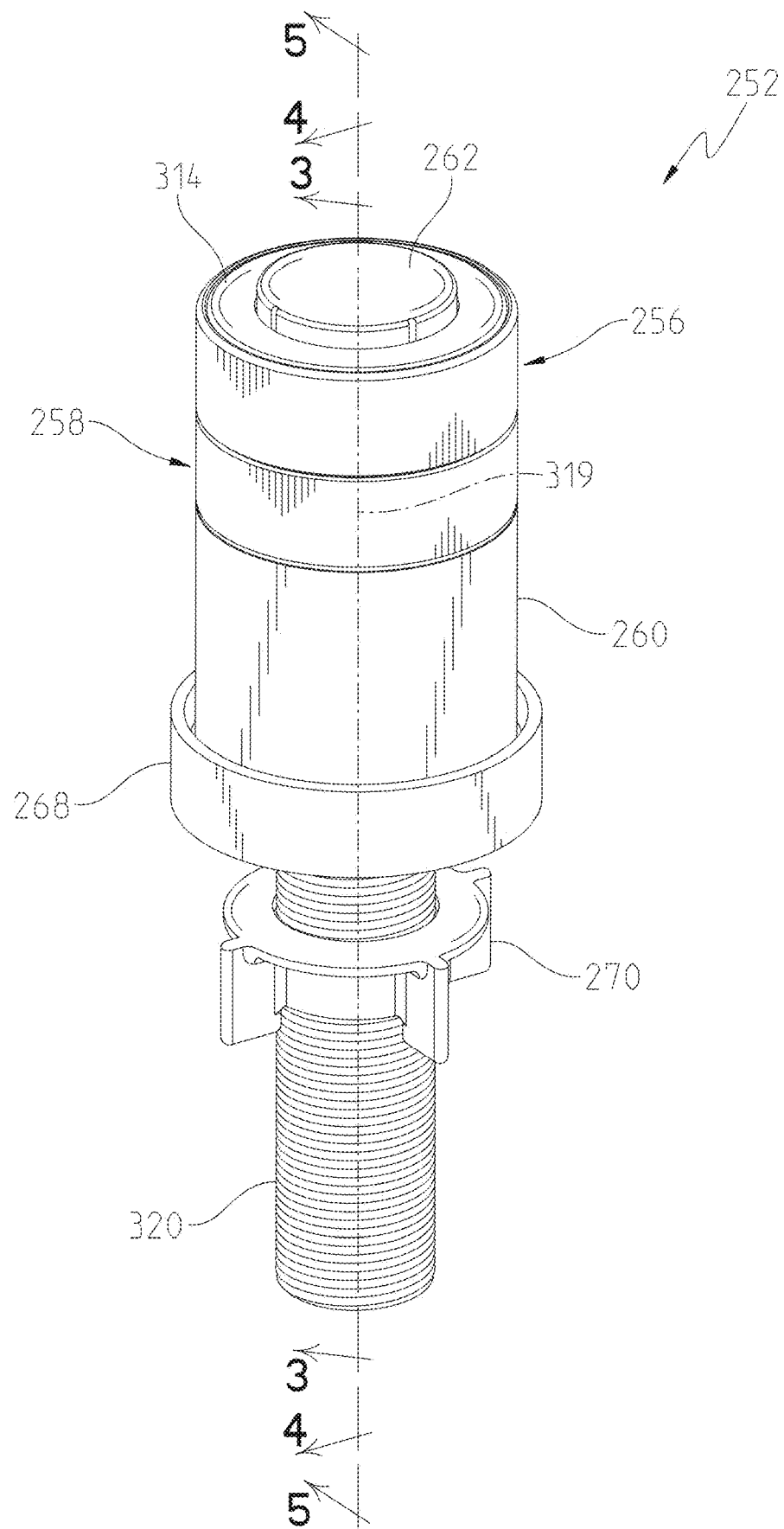
FIG. 2A is a perspective view of a metered dispense input device for use with the exemplary electronic faucet of FIG. 1 in accordance with the present disclosure.
Figure 2B:
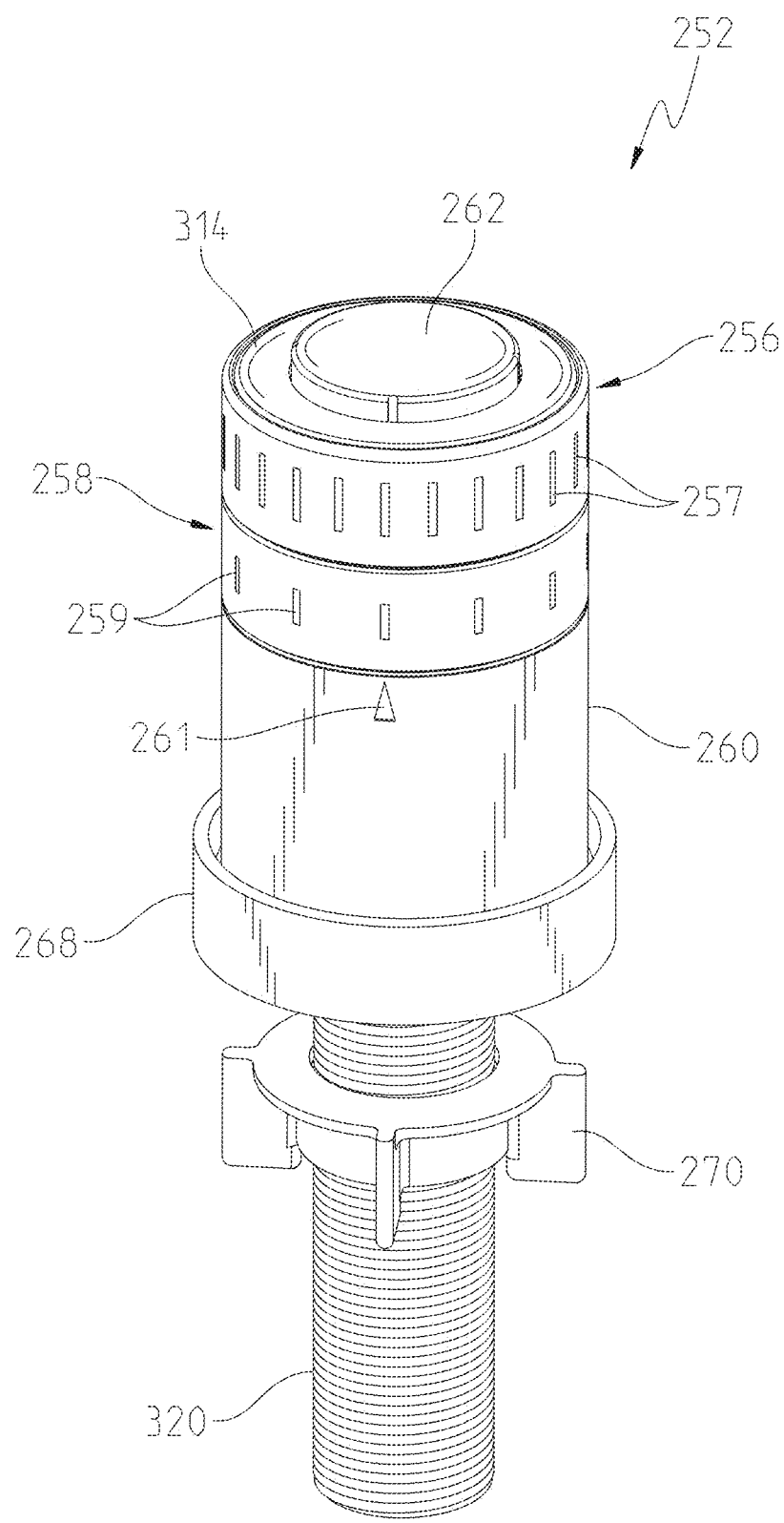
FIG. 2B is a perspective view of a metered dispense input device for use with the exemplary electronic faucet of FIG. 1 in accordance with the present disclosure, wherein the metered dispense input device further includes indicator markings.
Figure 2C:
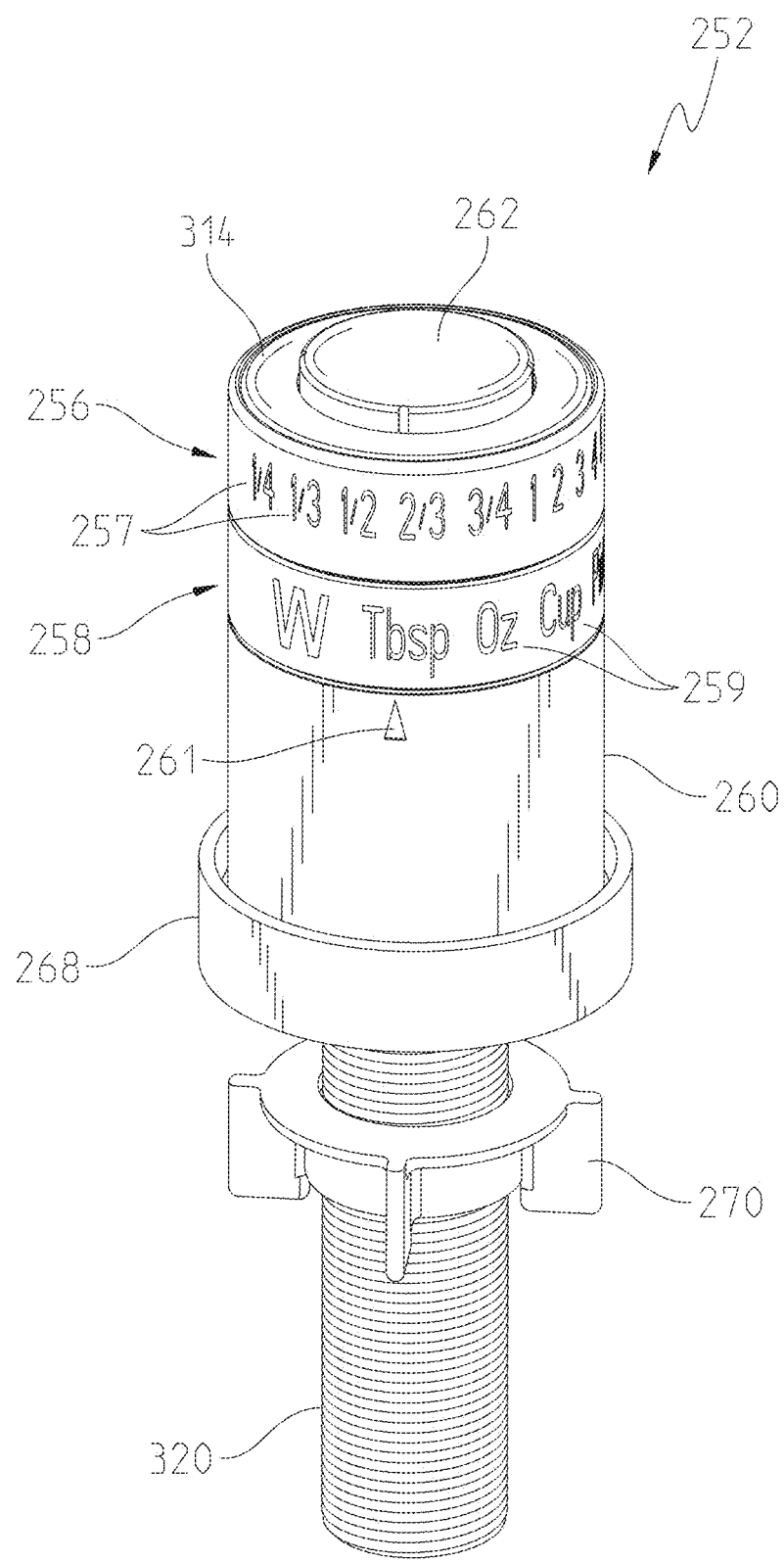
FIG. 2C is first perspective view of a further illustrative metered dispense input device similar to FIG. 2B, showing indicator markings as indicia representing serving units and quantities.
Figure 2D:
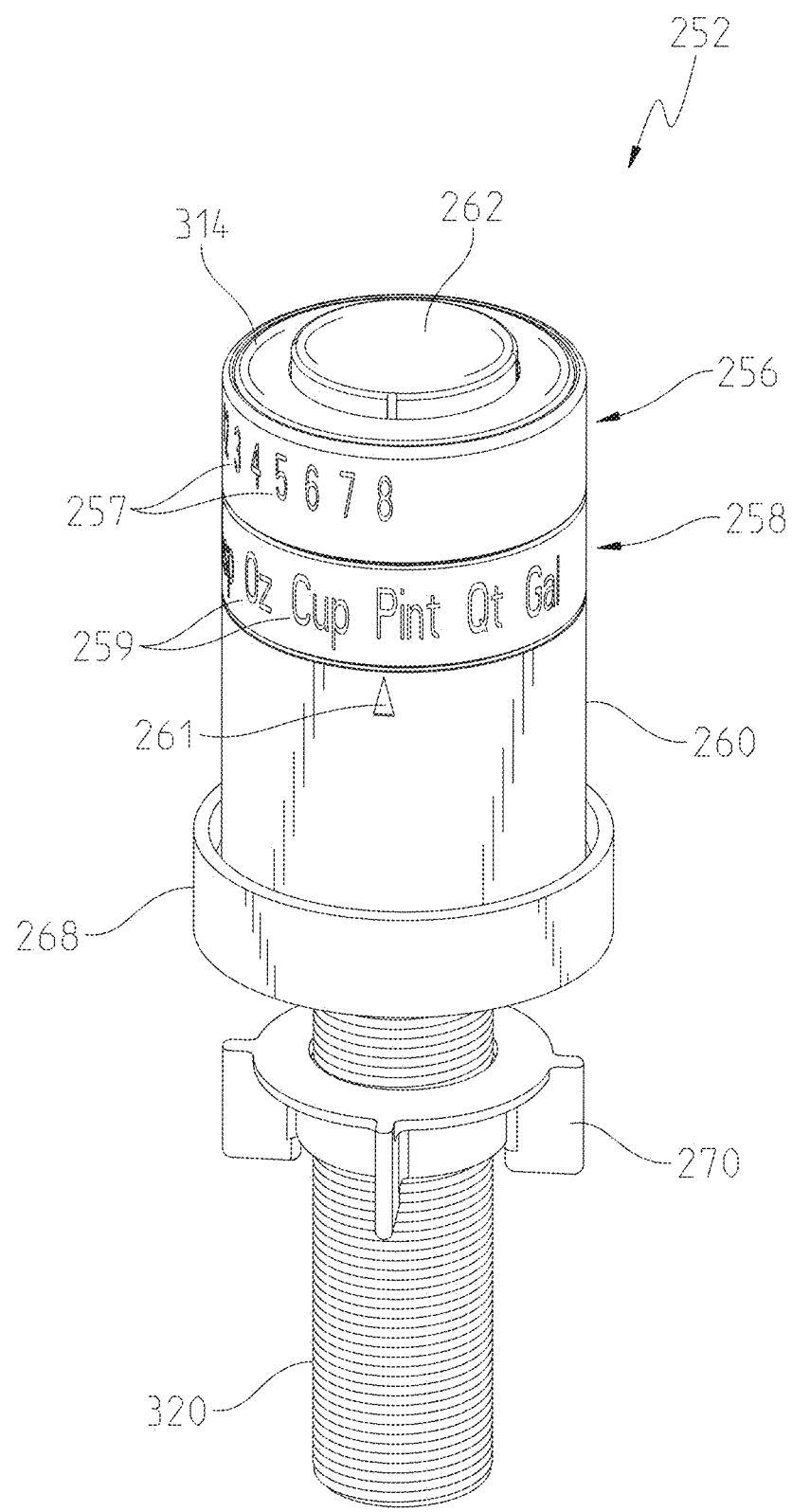
FIG. 2D is a second perspective view of the illustrative metered dispense input device of FIG. 2C, showing the input dials rotated clockwise.

As shown in FIG. 2B, markings 257 and 259 may be present on the outer surface of each of the quantity dial 256 and the units dial 258, respectively, to facilitate selection of a particular unit and/or quantity of measurement by the user. An indicator, such as an arrow 261, may be supported by the outer shell 260 for aligning the markings 257 and 259 as the dials 256 and 258 are rotated into a desired position. With reference to FIGS. 2C and 2D, illustrative markings on the quantity dial 256 include numerical units of ¼, ⅓, ½, ⅔, ¾, 1, 2, 3, 4, 5, 6, 7 and 8, while illustrative markings on the units dial 258 include W, Tbsp, Oz, Cup, Pint, Qt and Gal. Marking W represents a warm-up function as further detailed herein, while Tbsp, Oz, Cup, Pint, Qt and Gal represents liquid serving sizes of tablespoon, ounce, cup, pint, quart and gallon, respectively.

Figure 10:
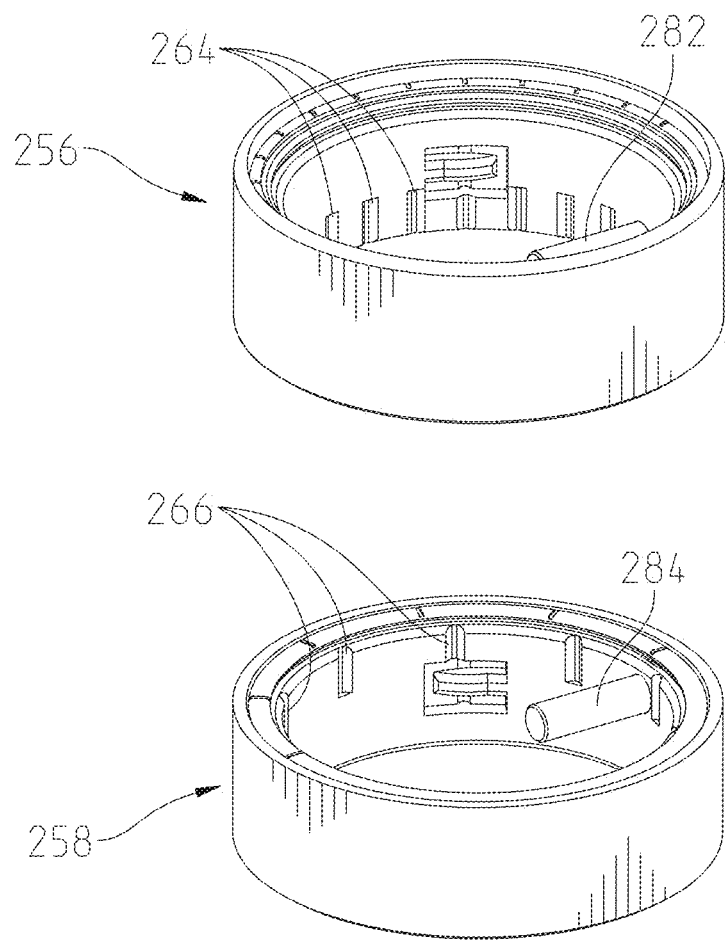
FIG. 10 is a perspective view of dials used in the metered dispense input device of FIG. 2.
Figure 11:
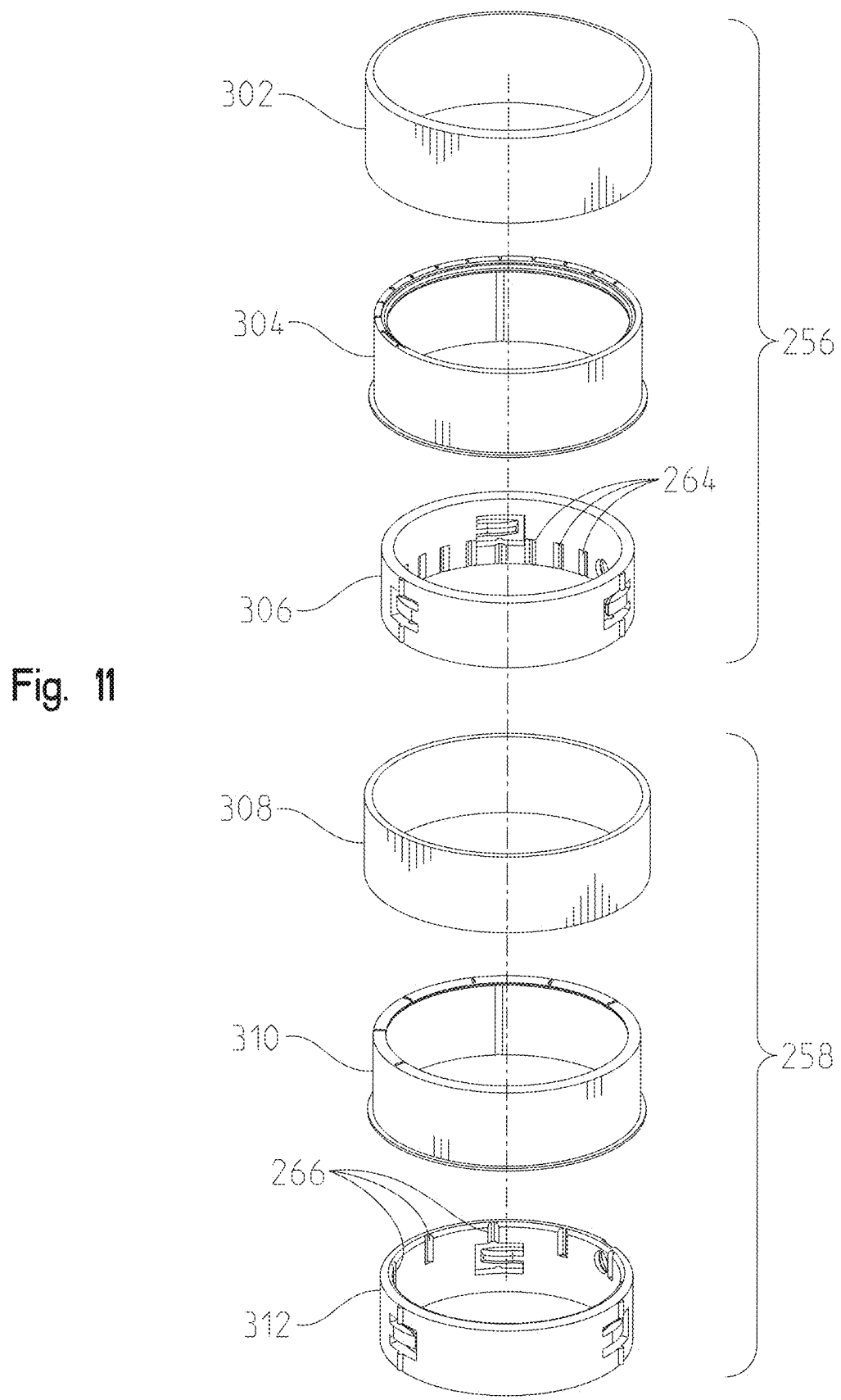
FIG. 11 is an exploded view of the dials of FIG. 10.
Figure 12:
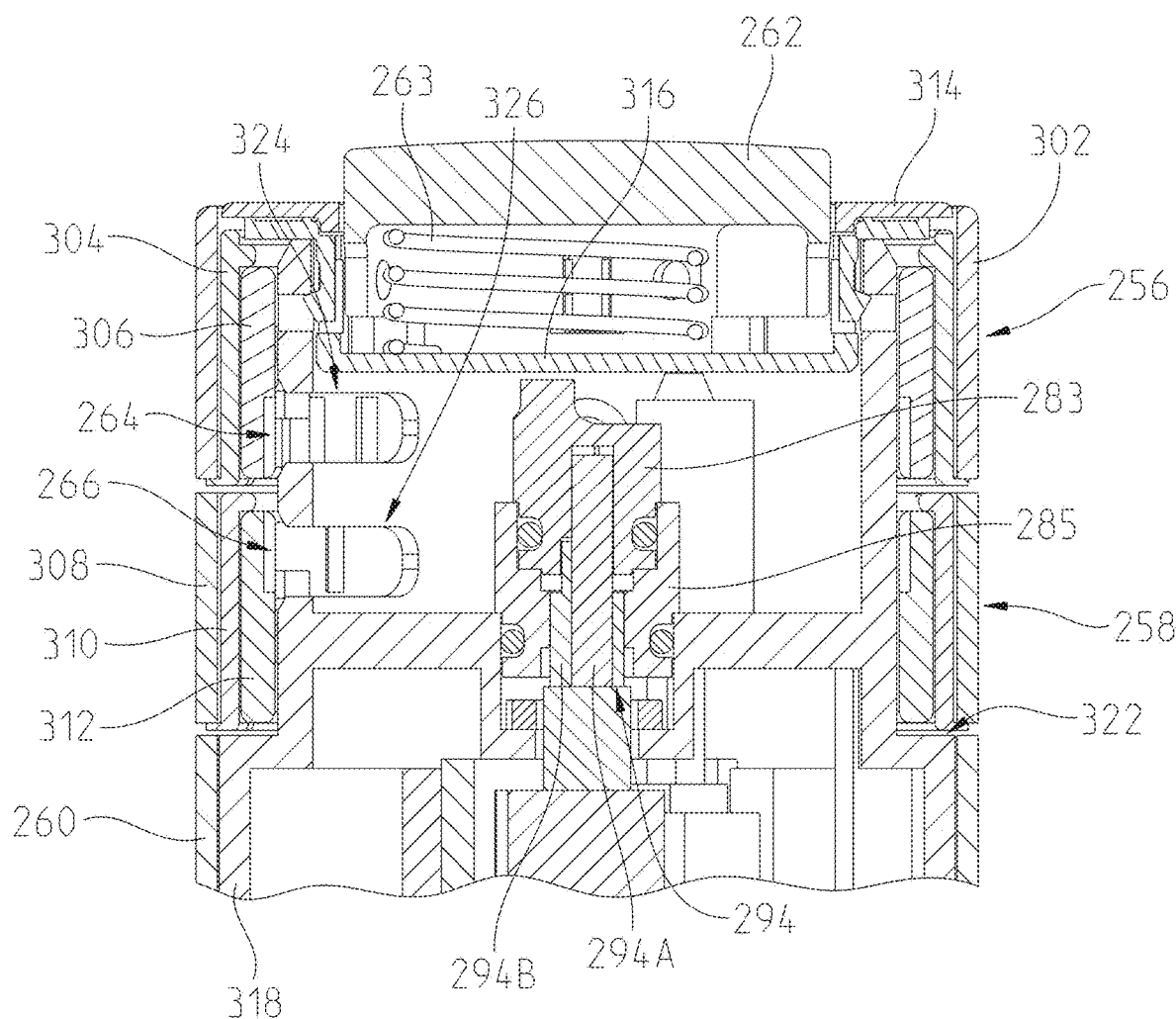
FIG. 12 is a detailed cross-sectional view of the upper portion of the metered dispense input device of FIG. 2.
Figure 13:
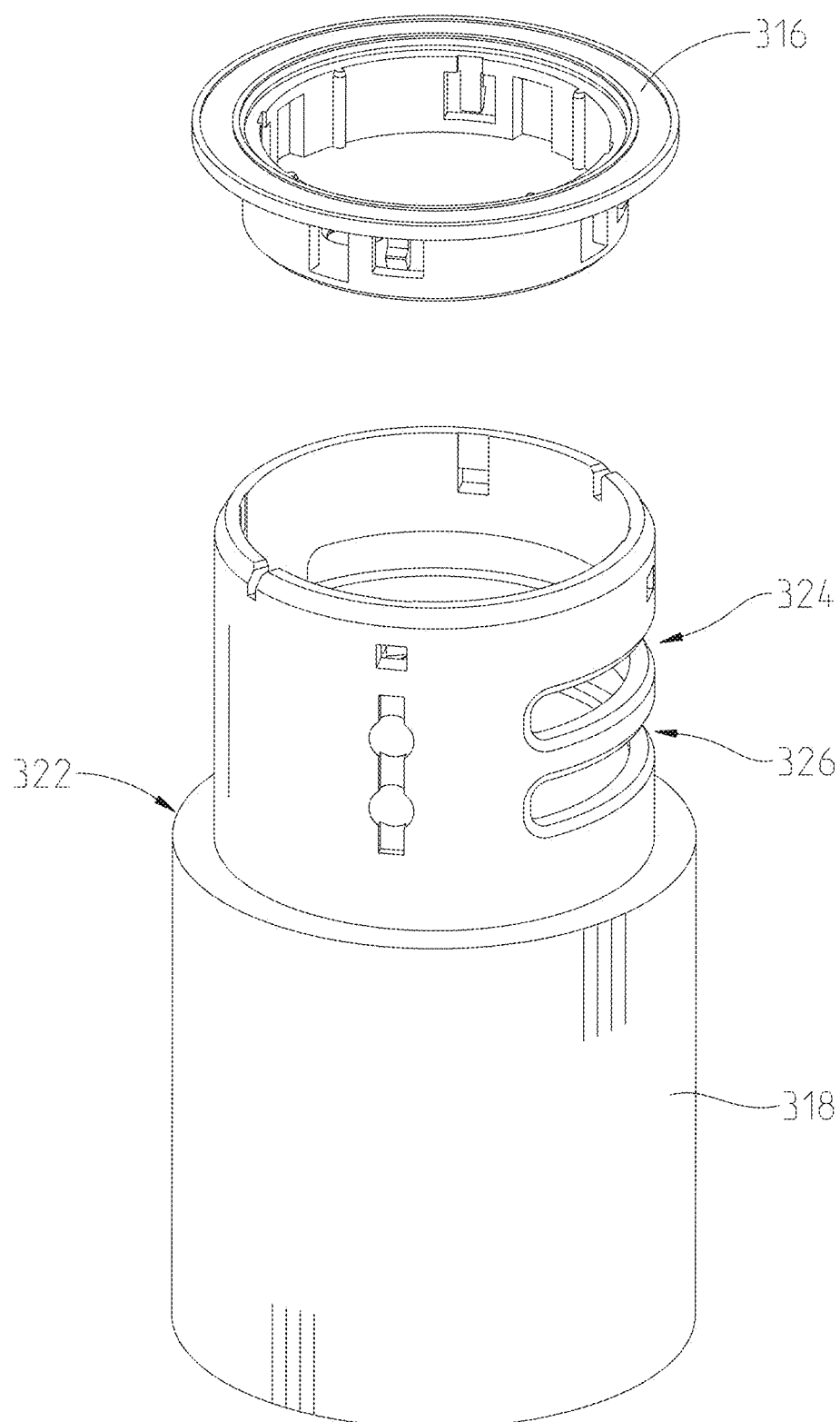
FIG. 13 is an exploded view of a shell of the metered dispense input device of FIG. 2.
Figure 14:
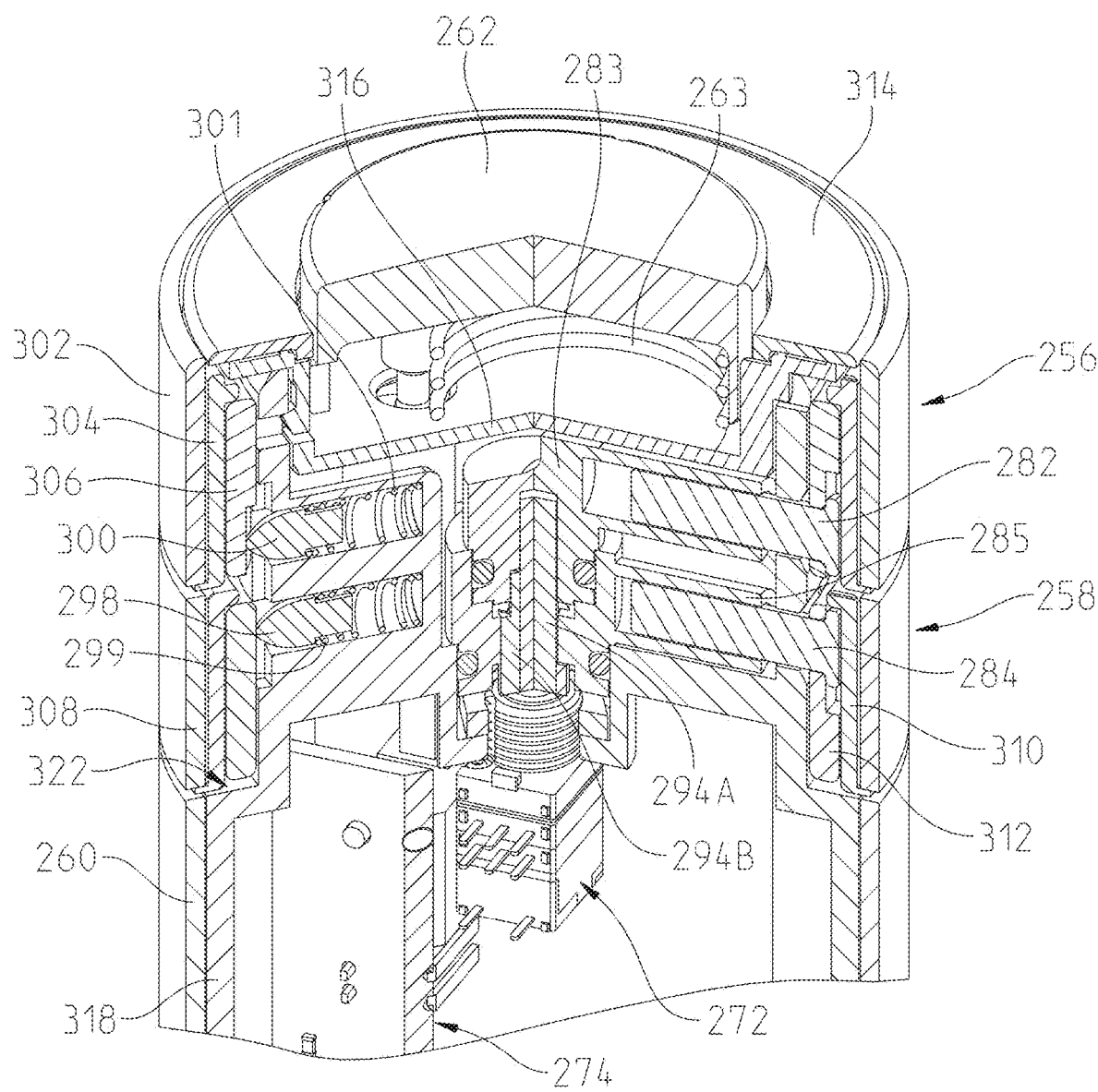
FIG. 14 is a perspective view in cross-section of the metered dispense input device of FIG. 2.

As shown generally in FIGS. 2-14 and more specifically in FIGS. 10 and 11, the quantity dial 256 includes an outer ring 302, a middle ring 304, and an inner ring 306. Similarly, the units dial 258 includes an outer ring 308, a middle ring 310, and an inner ring 312. The outer rings 302, 308 provide tangible surfaces which the user contacts to rotate the dials 256, 258 during operation of the metered dispense input device 252. The middle rings 304, 310 function to rotatably couple the respective outer rings 302, 308 to the inner rings 306, 312. The inner rings 306, 312 support the linkages 284, 282 that are configured to connect dials 256, 258 to potentiometer 272, as further discussed herein.

The inner ring 306 of the quantity dial 256 further includes circumferentially spaced recesses, illustratively grooves 264, along the inside surface of the inner ring 306. The grooves 264 are configured to selectively receive a detent 300 (FIGS. 3 and 11), wherein each groove 264 corresponds with an available quantity selection. A spring 301 biases the detent 300 radially outwardly for engagement with a selected groove 264. The inner ring 312 of the units dial 258 further includes circumferentially spaced recesses, illustratively grooves 266, along the inside surface of the inner ring 312. The grooves 266 are configured to selectively receive a detent 298 (FIG. 3), wherein each groove 266 corresponds with an available serving size. A spring 299 biases the detent 298 radially outwardly for engagement with a selected groove 266. The engagements of the detents 300, 298 in the corresponding grooves 264, 266 yield an amount of liquid that is communicated to the wireless control module 200 and the communicated amount of liquid is subsequently dispensed from the electronic faucet 10 upon actuation by operation of the activation button 262. In one illustrative embodiment, the engagement of the detents 300, 298 in the corresponding grooves 264, 266 may also yield an auditory output of the selected quantity and serving size via the wireless connection 254 between the metered dispense input device 252 and the electronic faucet 10.

Figure 4:
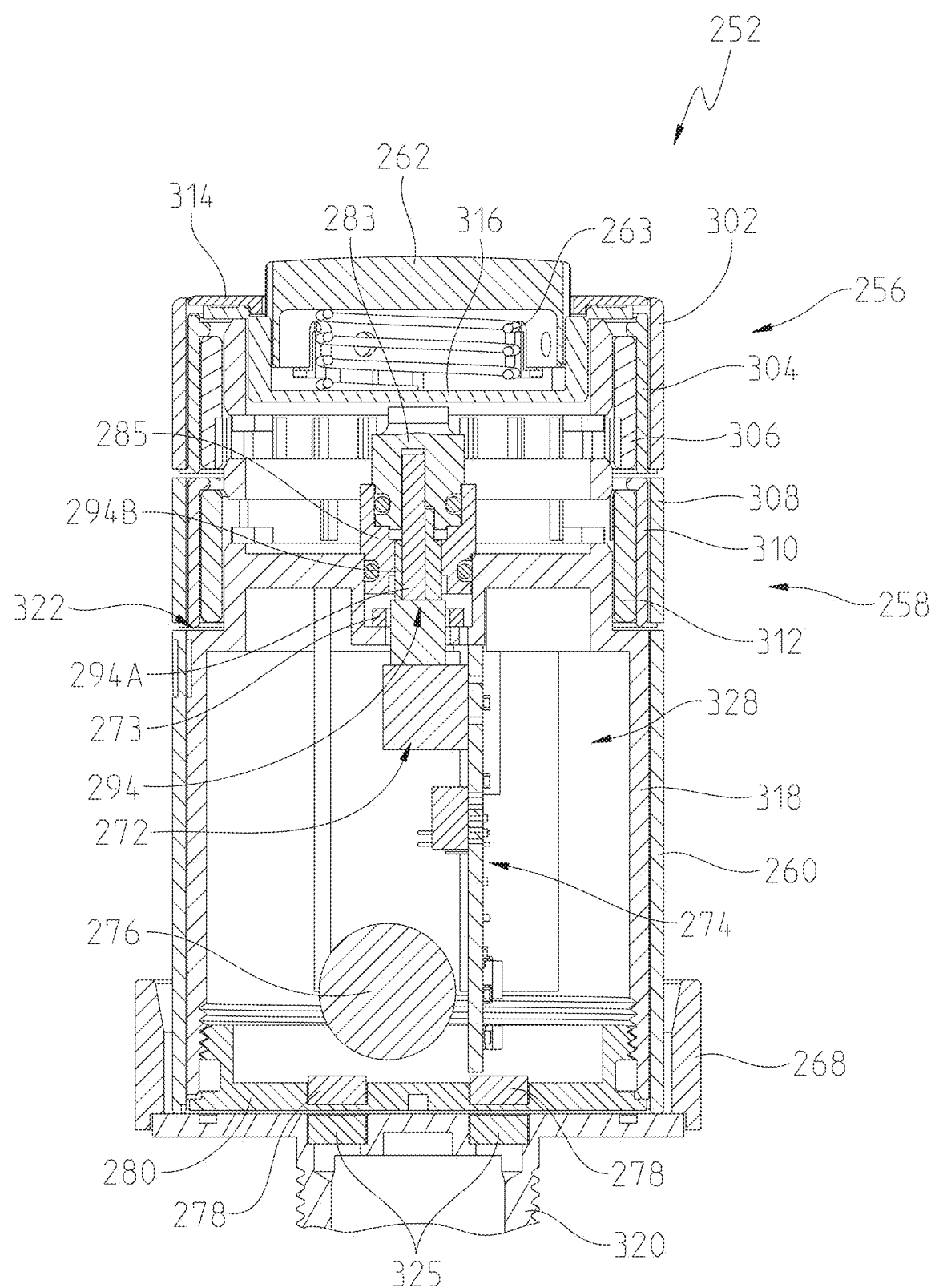
FIG. 4 is another cross-sectional view of the metered dispense input device of FIG. 2.

Referring now to the illustrative embodiment of FIGS. 3-5, an outer shell 260 provides a housing for the internal components of the metered dispense input device 252 discussed further herein. The outer shell 260 is adjacent to and coupled to an inner shell 318. The inner shell 318 illustratively extends beyond the height of the outer shell 260 and is contoured to provide a ledge 322 upon which the quantity dial 256 and the units dial 258 are positioned. As shown in at least FIGS. 6-9, the inner shell 318 includes apertures 324, 326 that are configured to receive linkage 282 of the quantity dial and linkage 284 of the units dial 258, respectively, to operably couple the quantity dial 256 and the units dial 258 relative to the inner shell 318.

As shown in the illustrative embodiment of FIGS. 3-5, the inner shell 318 is threadingly engaged with a battery access cover 280 to provide an inner chamber 328 within the metered dispense input device 252. The circuit card 274 is illustratively positioned within the inner chamber 328, and includes the processor 242 and the potentiometer 272. The potentiometer 272 is illustratively coupled to the circuit card 274 via soldering, while a threaded nut 273 illustratively couples the potentiometer 272 and the attached circuit card 274 to the inner shell 318. The potentiometer 272 illustratively includes a potentiometer shaft 294 operably coupled to the linkages 282 and 284 via connectors 283 and 285, such as sleeves, respectively. In an illustrative embodiment, the potentiometer shaft 294 is a coaxial dual shaft type having a rotatable inner shaft 294A and an independently rotatable outer shaft 294B, each providing independent position readings for the quantity dial 256 and the units dial 258. The connectors 283 and 285 receive the linkages 282 and 284 to connect the dials 256 and 258 to the potentiometer shafts 294A and 294B. Such an arrangement facilitates having a small opening in the bulkhead of the metered dispense input device 252, which minimizes the diameter of o-rings 286 and 288 operably coupled to the connectors 283 and 285, respectively. Such minimization of the diameters for o-rings 286 and 288 enable the user to apply a light pressure to turn the quantity dial 256 and the units dial 258 due to the mechanical advantage provided to the user in relation to the drag of o-rings 286 and 288. For example, the diameters of o-rings 286 and 288 are several times smaller than the diameter of either dial 256 and 258 onto which the user is applying force.

As further shown in FIG. 3, the potentiometer shaft 294 functions to receive the user's quantity and serving size selections via the quantity dial 256 and the units dial 258 and transmit the selections to the potentiometer 272. In one embodiment, the potentiometer shaft 294 is integrally formed with potentiometer 272. The potentiometer shafts 294 extend through the potentiometer 272 and rotate the electrical components inside, varying the resistance of the potentiometer 272 thereby, allowing the circuit card 274 to "read" the position of the potentiometer shafts 294. The inner potentiometer shaft 294A and the outer potentiometer shaft 294B communicate with the quantity dial 256 and the units dial 258, respectively, such that each of the inner shaft 294A and the outer shaft 294B can provide independent position readings. In another illustrative embodiment, the inner potentiometer shaft 294A and the outer potentiometer shaft 294B communicate with the units dial 258 and the quantity dial 256, respectively.

The potentiometer 272 functions to receive the signal (of the user's quantity and serving size selections) from the shaft 294 and transmit the signal to the processor of the circuit card 274, illustratively upon actuation of the activation button 262. In some embodiments, alternatives to the potentiometer 272 may be utilized. For example, other rotary sensors may be used, such as magnets in dials 256, 258 with magnetic sensors to operate the metered dispense input device 252. A switch, such as a microswitch, or an encoder may also be implemented to indicate rotational positions of the dials 256 and 258.

The circuit card 274 may be electrically coupled to a power supply that is configured to provide power to the metered dispense input device 252. The power supply may illustratively be a battery 276, or may otherwise be a capacitor, a hydrogenator, or may otherwise be hard wired or capable of wireless charging. The circuit card 274 may further include an electrical button 292 operably coupled to the activation button 262 to operate the metered dispense input device 252 as discussed earlier. A threaded piston 290 and a connecting pin 293 may operably couple the activation button 262 to the electrical button 292.

The battery access cover 280 may include a magnet 278 configured to magnetically couple the metered dispense input device 252 to a threaded anchor 320 to install the metered dispense input device 252 on a mounting deck, such as a sink deck (not shown), using a mount 268. In alternate embodiments, the metered dispense input device 252 may be coupled to the mount deck by using alternate methods, such as via an adhesive. In yet additional embodiments, the metered dispense input device 252 may be modified to be removably or permanently attached to a faucet 10 and/or its components (e.g., electronic proportioning valve (EPV), solenoid valve, etc.). If permanently attached to the faucet 10, the metered dispense input device 252 may be hard wired to the faucet 10 and the system of the faucet 10 with the metered dispense input device 252 could be battery powered or otherwise powered as described above.

Referring specifically to FIG. 4, in an embodiment having the threaded anchor 320, the threaded anchor 320 is positioned adjacent to the battery access cover 280 and includes magnets 325 that are magnetically coupled to the magnet(s) 278 of the battery access cover 280. The magnetic coupling of the magnets 278 with the magnets 325 assist in orienting and retaining the metered dispense input device 252. Further, such a magnetic coupling enables a user to easily remove the metered dispense input device 252 from a mounting deck and operate the metered dispense input device 252 remotely from the mounting deck, for example, in a user's hand via battery 276. In other illustrative embodiments, the threaded anchor 320 may be attached to the battery access cover 280 via other coupling means such as an adhesive.

Figure 6:
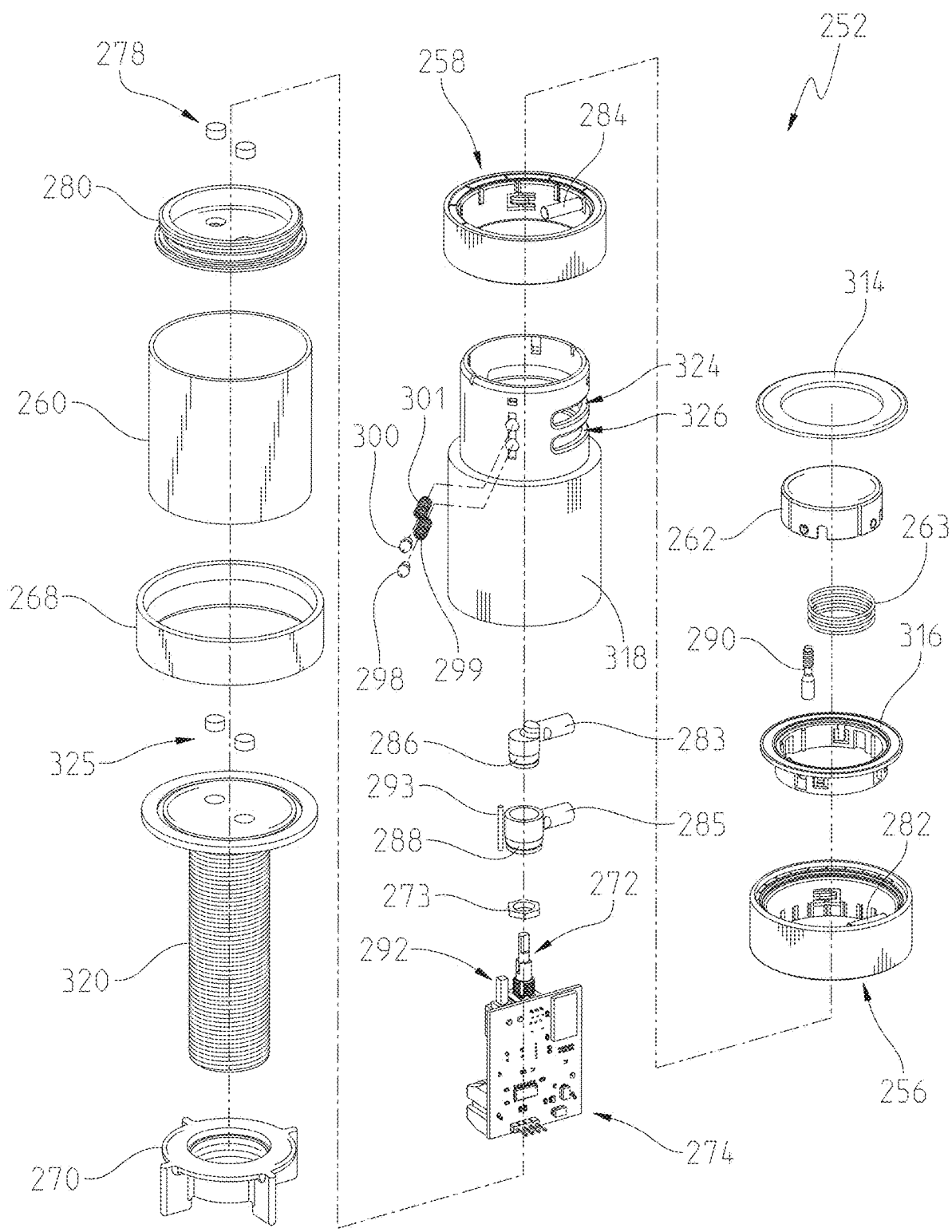
FIG. 6 is an exploded perspective view of the metered dispense input device of FIG. 2.

Now referring specifically to FIGS. 2 and 6, a nut 270 may be threadingly engaged with the threaded anchor 320 and configured to cooperate with the magnets 278, 325 to mount the metered dispense input device 252 to the mount deck. The nut 270 is adjustable along the anchor 320 and functions to retain the anchor 320 on the mount deck (not shown). Then, to mount the metered dispense input device 252, the magnets 278, 325 are magnetically coupled to each other as discussed above. Such a mounting configuration enables removal or dismounting of the metered dispense input device 252 without unthreading the nut 270 along the anchor 320.

In one illustrative embodiment, to operate the metered dispense input device 252, a user may activate the metered dispense input device 252 by depressing the activation button 262 so that the button 262 slides on the grooves in the seat 316, returning to its original position once no longer actuated due to the spring loaded configuration of the button 262. The activation button 262 may be attached by the threaded piston 290 that slides in a piston bore, ensuring the piston 290 slides smoothly and maintains its orientation. When the activation button 262 is depressed, the small pin 293 coupled to the piston 290 may pass through an o-ring 296 (FIG. 5) to contact the button 292 on the circuit card 274. Such an arrangement allows minimization of the size of the metered dispense input device 252 and also allows minimization of the size of the o-ring 296. By minimizing the size of the o-ring 296, the resistance to pushing the button 262 is reduced while still maintaining a watertight seal.

In subsequent operation of the metered dispense input device 252, the user rotates the quantity dial 256 and/or the units dial 258 to the desired position for dispensing the appropriate amount of water, if needed. As discussed previously, each user-selectable position for the quantity dial 256 and the units dial 258 has a matching notch on the inner diameter of the corresponding dial to receive a dampened spring plunger or the respective detents 300, 298, as discussed above. The shaped end of the respective spring plungers or the respective detents 300, 298 pull the rings of the dials 256, 258 into precise position once the user rotates the dial close enough for the respective detents 300, 298 to enter the respective grooves 264, 266 as discussed above.

Once the device 252 is activated, software within the processor 242 on the printed circuit board 274 reads the potentiometer values and has a correlated range of readings for each position on each of the quantity dial 256 and the units dial 258. If either the quantity dial 256 or the units dial 258 are slightly to the right or left of specific value, the software will interpret that input as the closest specific value. Furthermore, the software is specifically programmed to ignore multiple actuations of the button 262 in quick succession to reduce user errors. That is, a button press or button presses of the activation button 262 after the initial activation will be ignored until the dispense is complete. This allows for repeatable potentiometer readings for each position and provides tactile and auditory feedback to the user.

When the activation button 262 is pressed, a latching circuit maintains electricity to the functional circuits of the circuit card 274 until the metered dispense input device 252 finishes reading the potentiometer 272 values and wirelessly transmits the values and the activation command to the control module 200, that is in line with the mixed water flow through the electrically operable valve 22. The control module 200 then communicates to the corresponding solenoid(s) 22 to activate and measure the flow of water until the desired amount input by the user has exited the faucet 10 at which time, the controller 200 closes the solenoid valve 22 and awaits the next wireless communication from the metered dispense input device 252. In one embodiment, the controller 200 is powered with alternating current (AC). However, it is within the scope of the present disclosure that the controller 200 is alternatively powered.

In one illustrative embodiment, the user can use a touch interface of the metered dispense input device 252 to command the solenoid valve 22 of the faucet 10 to close during a dispense process. In this instance, the dispense action is cancelled via the control module 200, and the faucet 10 returns to regular operation and awaits further input from the user. Moreover, the flow rate and temperature of the exiting liquid can be adjusted through an inline mixing and volume control valve in the faucet 10 without altering the dispense function command from the metered dispense input device 252 unless the manual valve 20 is in an off position to prevent liquid discharge.

Figure 15:
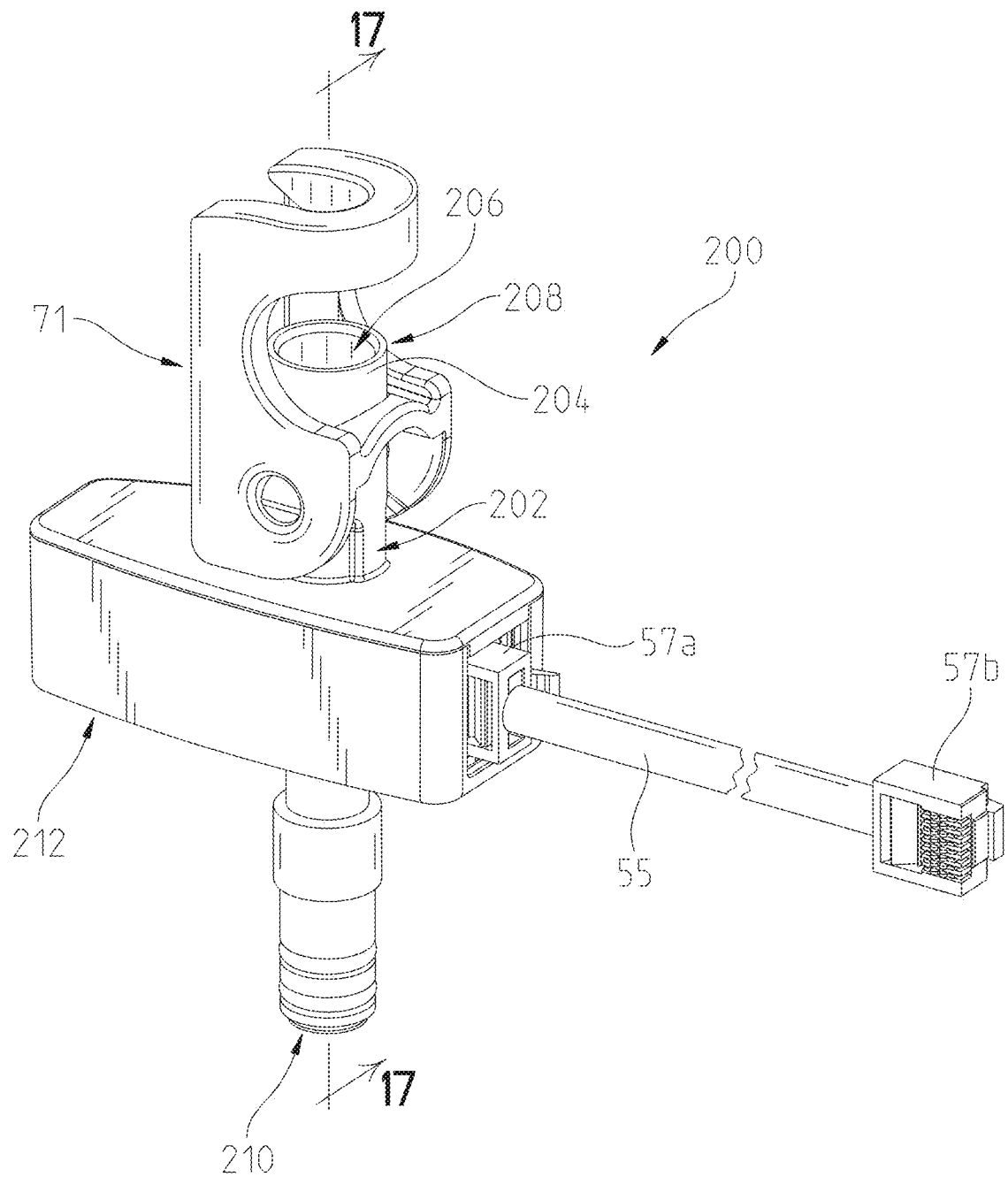
FIG. 15 is a perspective view of an illustrative wireless control module of FIG. 1.
Figure 16A:
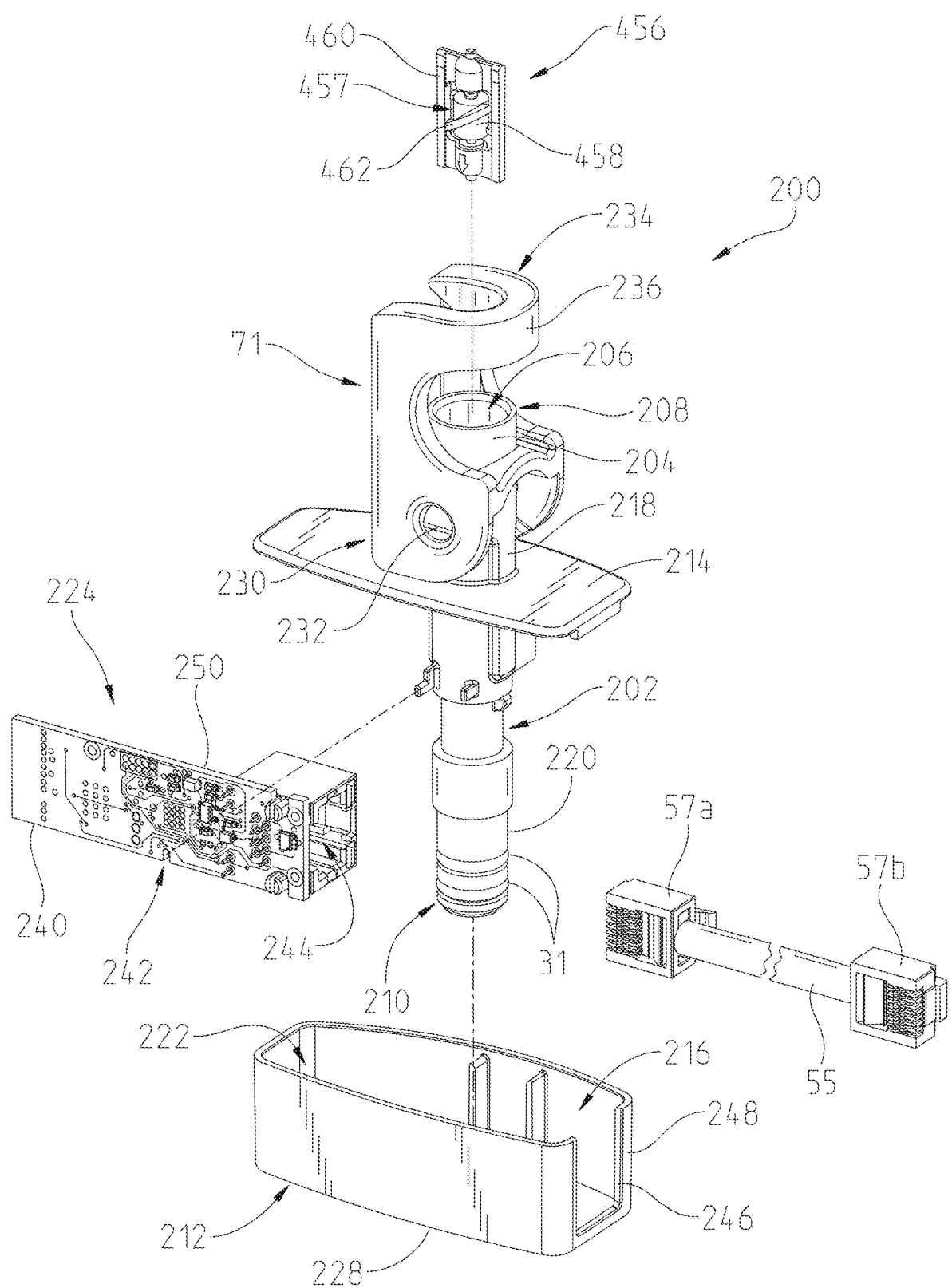
FIG. 16A is an exploded perspective view of the illustrative wireless control module of FIG. 15.
Figure 16B:
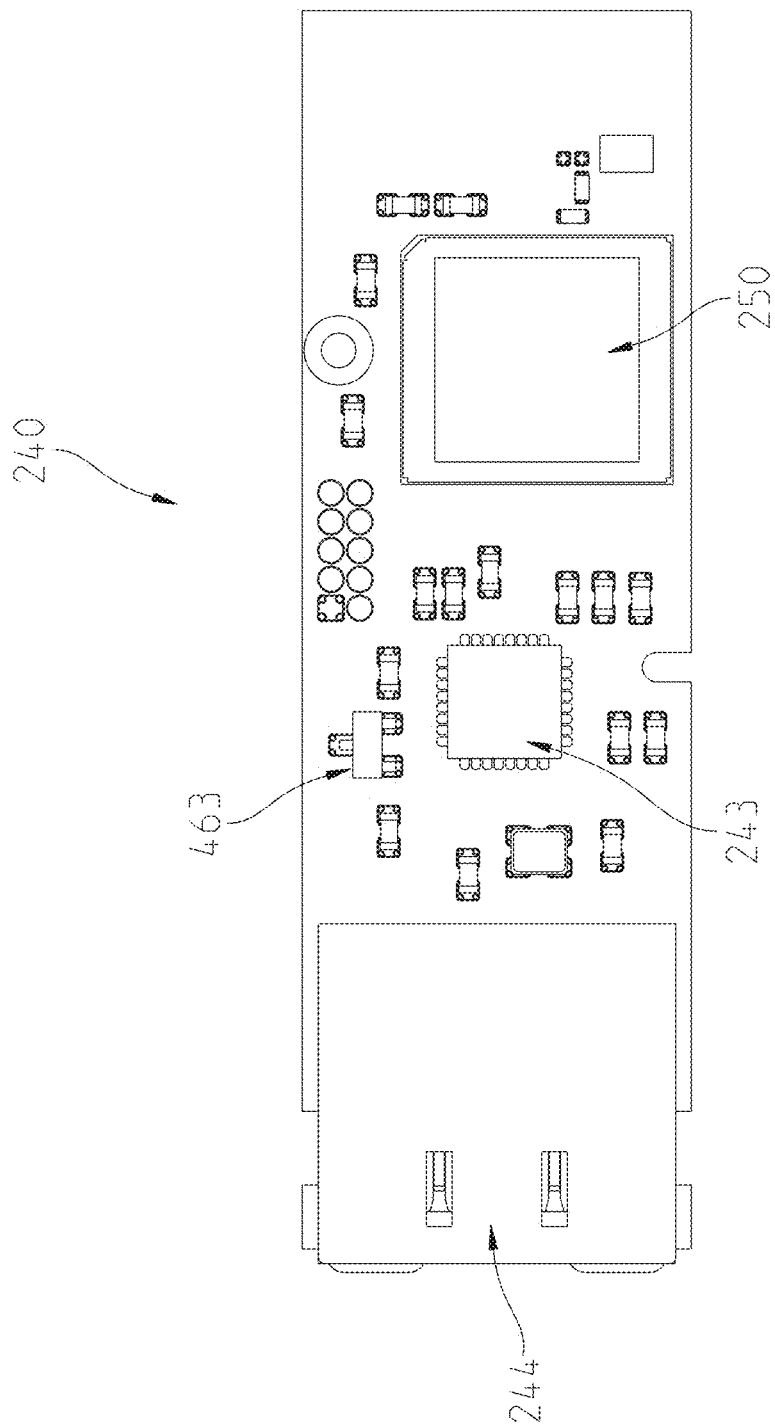
FIG. 16B is a plan view of the printed circuit board of FIG. 16A.
Figure 17:
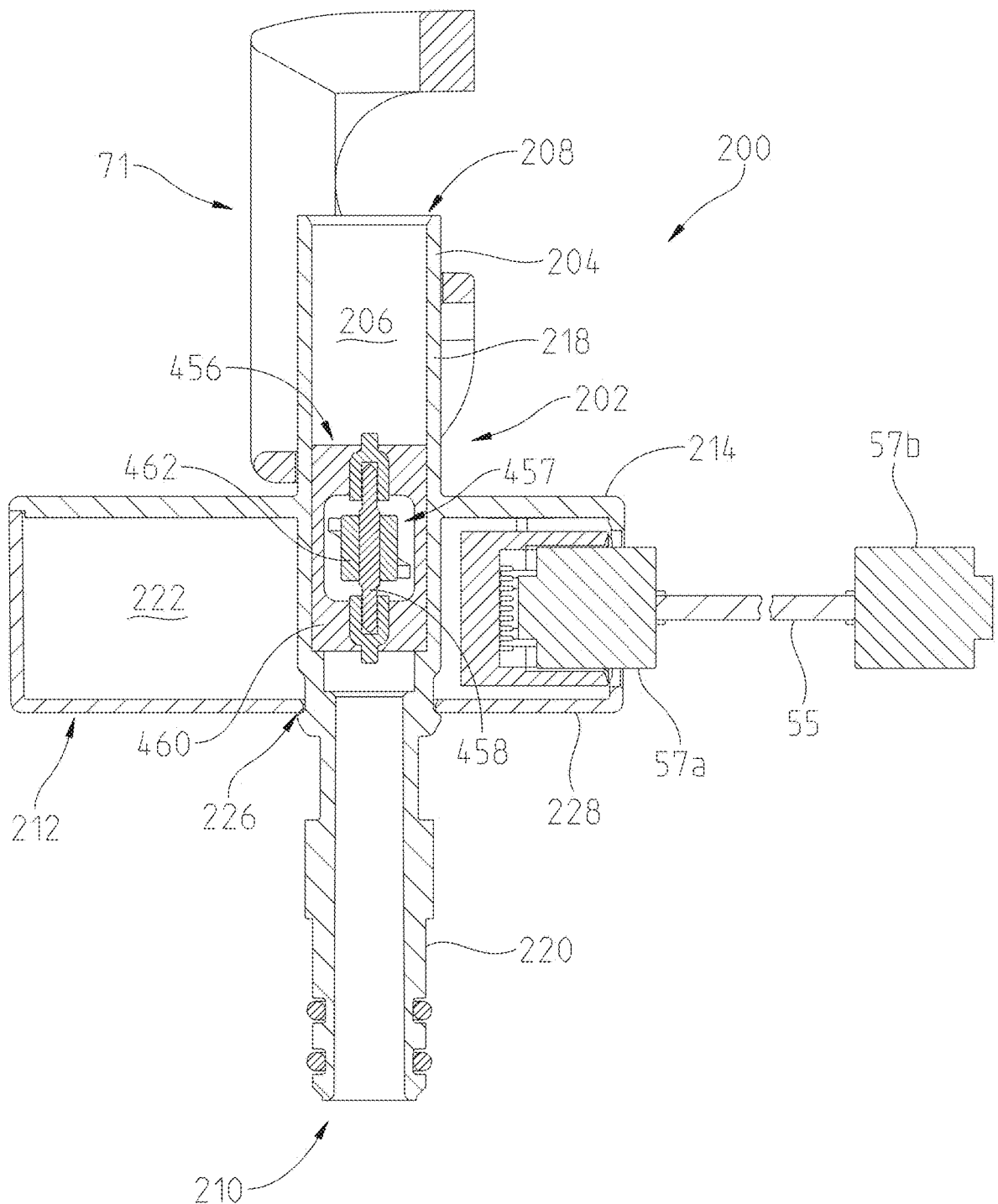
FIG. 17 is a cross-sectional view taken along line 17-17 of FIG. 15.

With reference to FIGS. 15-17, the illustrative wireless control module 200 includes a main body 202 including a tube 204 defining a waterway or fluid passageway 206 extending between an inlet 208 and an outlet 210. The main body 202 may be formed from a polymer, such as a glass fiber reinforced thermoplastic material. A housing or cover 212 is coupled to the main body 202. More particularly, an end wall 214 of the main body 202 is coupled to an open end 216 of the housing 212. The housing 212 may be formed from a polymer, such as an acetal copolymer. An inlet portion 218 of the tube 204 extends in a first direction from the end wall 214, and an outlet portion 220 of the tube 204 extends in a second direction, opposite the first direction, from the end wall 214. A chamber 222 is defined within the housing 212 and receives the wireless control module 200. The outlet portion 220 of the tube 204 extends through the chamber 222 and out of the housing 212 via an opening 226 in an end wall 228 of the housing 212.

The inlet 208 is fluidly coupled to an outlet of the solenoid valve assembly 22, the outlet corresponding with the water passageway 28d of FIG. 1. The outlet 210 of the control module 200 is fluidly coupled to the water outlet 19 of the spout 12 (FIG. 1). More particularly, the inlet portion 218 of the tube 204 receives the outlet tube corresponding with water passageway 28d (FIG. 1) of the solenoid valve assembly 22. A swing clip 71 of the control module 200 secures the outlet tube corresponding with water passageway 28d (FIG. 1) of the solenoid valve assembly 22 to the tube 204 of the wireless control module 200. More particularly, a first end 230 of the swing clip 71 is pivotably coupled to pins 232 on the inlet portion 218 of the tube 204. The outlet portion 220 of the tube 204 is received within a passageway in fluid communication with the water outlet 19 of the spout 12 (FIG. 1). An O-ring 31 may be positioned intermediate the tube 204 and the passageway to provide fluid scaling therebetween.

The wireless control module 200 illustratively includes a printed circuit board 240 received within the chamber 222 of the housing 212. The printed circuit board 240 illustratively supports a processor 243, such as a conventional microprocessor. An auxiliary port 244 may also be supported by the printed circuit board 240 and may be in electrical communication with the valve controller 24. The auxiliary port 244 is accessible through an opening 246 in a side wall 248 of the housing 212.

The wireless transceiver 250 is illustratively supported by the printed circuit board 240 and is in electrical communication with the wireless control module 200. The wireless transceiver 250 is configured to wirelessly communicate (e.g., receive and/or transmit wireless signals) with the metered dispense input device 252. Such wireless communications may be via known technologies, such as wireless communications in the 2.4 GHz frequency band including, for example Wi-Fi, ZigBee, and Bluetooth. The wireless transceiver 250 illustratively comprises a wireless radio and antenna, such as a Wi-Fi module or chip, a ZigBee module, or a Bluetooth module. In one illustrative embodiment, the wireless transceiver 250 comprises a chip configured to be in communication with the wireless connection 254. In one embodiment, the wireless connection 254 between transceiver 250 and metered dispense input device 252 is a Bluetooth or radio frequency connection. In an alternate embodiment, the connection is a Wi-Fi connection. In an alternate embodiment, the metered dispense input device 252 may comprise a voice recognition and conversion device in wireless communication with the transceiver 250. As further detailed herein, the metered dispense input device 252 may communicate over the Internet through the cloud to the wireless control module 200.

A flow sensor 456 is illustratively supported by the tube 204 of the main body 202 to detect water flow within the waterway 206, and is in electrical communication with the wireless control module 200 and/or the valve controller 24 (FIG. 1). More particularly, the flow sensor 456 illustratively comprises a flow turbine assembly 457 including a flow turbine 458 supported for rotation by a flow turbine cage 460. The flow turbine cage 460 may be received within the tube 204 such that water flow through the passageway 206 rotates the flow turbine 458. The flow turbine 458 may be a magnetic flow turbine including a magnet supported by rotor 462 and a sensor or detector 463 supported on the printed circuit board 240, the detector 463 being configured to detect rotation of the rotor 462. The number of rotations detected by the sensor 456 is correlated to flow rate and/or flow volume by the wireless control module 200 and/or the valve controller 24 (FIG. 1). The valve controller 24 (FIG. 1) controls the electrically operable solenoid valve 22 to dispense a predetermined amount of water based upon the input from the flow sensor 456.

The wireless control module 200 illustratively provides a means for reading the flow turbine 456, the temperature sensor 27 and the transceiver 250, such as Wi-Fi chip, ZigBee module, or Bluetooth module for receiving and transmitting data. An electronic cable 55 communicates commands between the wireless control module 200 and the electronic control valve 22. Illustratively, the electronic cable 55 is a serial cable including opposing first and second end connectors 57a and 57b. The first connector 57a is coupled to the port of the valve assembly 20, while the second connector 57b is coupled to the port 56 of the wireless control module 200.

A modular waterway design may permit the wireless control module 200 to be inserted between the outlet of the electronic control valve 22 and the waterway extending through faucet spout 12.

A serial protocol illustratively exists between the wireless control module 200 and the processor 42. Serial communication between the control module 200 and the processor 42 is configured to occur bi-directionally. In addition to transmitting and receiving data signals, an 'interrupt' signal may be used to indicate to the recipient that a data transmission is about to begin. The interrupt signal allows both the wireless control module 200 and the processor 42 to go into low-power sleep modes until one is woken-up up by the other using the interrupt signal. This scheme allows for both devices to operate for long periods of time on battery power; as they are not always fully powered-up waiting for data. The serial protocol to send data has been uniquely defined. It is all register based. For example, to set the water state, an auxiliary device or smart spout can write the value of '1' to register 0x02 to turn on the valve 22. As another example, an auxiliary device 30 can request the current water temperature by requesting the value currently stored in register 0x05 in the valve controller 24. All serial message packets use a start byte, stop byte, message length byte and two byte cyclic redundancy check (CRC) to ensure data integrity.

While the above description illustrates the valve assembly and the wireless control module for use in connection with an electronic faucet 10, such as a kitchen faucet, it should be appreciated that they may be used in connection with other devices, such as a shower valve, a bathtub valve, a toilet, etc.

Although the invention has been described in detail with reference to certain preferred embodiments, variations and modifications exist within the spirit and scope of the invention as described and defined in the following claims.

The invention claimed is:

1. A metered dispense system adapted for use with a mounting deck, the metered dispense system comprising:
   an electronic faucet including a spout for delivering a fluid, an electrically operable valve controlling fluid flow through the spout and a valve controller operably coupled with the electrically operable valve and configured to open and close the electrically operable valve; and
   a metered dispense unit comprising:
      a shell defining a chamber;
      a threaded anchor coupled with the shell wherein the threaded anchor is adapted to be inserted through an opening in the mounting deck and secured with a nut whereby the shell is installable above the mounting deck;
      an input controller disposed within the chamber, the input controller being operably coupled with the valve controller of the electronic faucet;
      a rotatable first dial supported by the shell and operably coupled to the input controller, wherein the rotational position of the first dial selects one of a first plurality of values corresponding with a numerical unit;
      a rotatable second dial supported by the shell and operably coupled to the input controller, wherein the rotational position of the second dial selects one of a second plurality of values corresponding with a fluid serving size;
      an activation button positioned above the first dial and in communication with the input controller, the activation button operably coupled to the first dial and the second dial, wherein actuation of the activation button communicates the values selected by the first dial and the second dial to the valve controller via the input controller, the valve controller being configured to open and subsequently close the electrically operable valve to thereby dispense a selected volume of fluid wherein the selected volume of fluid is a function of both the numerical unit selected by the first dial and the fluid serving size selected by the second dial; and
      wherein the metered dispense input unit is spaced apart from the electronic faucet.

2. The metered dispense system of claim 1, wherein the input controller is coupled with a wireless transceiver disposed in the chamber and configured to transmit wireless signals to the valve controller to control operation of the electrically operable valve.

3. The metered dispense system of claim 1, wherein, when the activation button is actuated, a power supply is electrically coupled to the input controller.

4. The metered dispense system of claim 3, wherein a power supply is disposed within the chamber to power the metered dispense input unit.

5. The metered dispense system of claim 1 wherein the metered dispense input unit further comprises a battery disposed in the chamber which supplies electrical power to the input controller; and
   wherein the electronic faucet is adapted to be connected to a source of alternating current to power the valve controller.

6. The metered dispense system of claim 5, wherein the input controller is coupled with a wireless transceiver disposed in the chamber and configured to transmit wireless signals to the valve controller to control operation of the electrically operable valve.

7. The metered dispense system of claim 6, wherein the shell defines a longitudinal axis with the first dial and the second dial both being rotatable about the longitudinal axis and wherein the activation button is actuated by axially depressing the activation button.

8. The metered dispense system of claim 1, wherein the shell defines a longitudinal axis with the first dial and the second dial both being rotatable about the longitudinal axis and wherein the activation button is actuated by axially depressing the activation button.

9. The metered dispense system of claim 1, further comprising at least one dial rotation sensor operably coupled with the first dial and the second dial, the at least one dial rotation sensor in communication with the input controller.

10. The metered dispense system of claim 9, wherein the input controller receives rotation inputs from the first dial and the second dial via the at least one dial rotation sensor, the input controller including a transceiver configured to wirelessly communicate with the valve controller to control operation of the electrically operable valve.

11. The metered dispense system of claim 1, wherein the first dial includes an inner ring having a plurality of recesses, wherein each recess corresponds to a discrete unit value of water to be discharged, the plurality of recesses configured to receive a first detent to select a unit of water to be discharged; and wherein the second dial includes an inner ring having a plurality of recesses, wherein each recess corresponds to a discrete quantity value of water to be discharged, the plurality of recesses configured to receive a first detent to select a quantity of water to be discharged.

12. A faucet comprising:

a metered dispense input unit including: a shell defining a chamber;

an input controller disposed within the chamber and configured to communicate with an electrically operable valve of a faucet;

a rotatable first dial supported by the shell and operably coupled to the input controller, wherein the rotational position of the first dial selects one of a first plurality of values corresponding with a numerical unit;

a rotatable second dial supported by the shell and operably coupled to the input controller, wherein the rotational position of the second dial selects one of a second plurality of values corresponding with a fluid serving size; and an activation button positioned above the first dial, the activation button operably coupled to the input controller;

an electrically operable valve operably coupled to the metered dispense input unit; and a control module in communication with the input controller and configured to control operation of the electrically operable valve.

13. The faucet of claim 12, the wireless control module having a tube with a flow sensor fluidly coupled with the electrically operable valve.

14. The faucet of claim 13, wherein the flow sensor includes a flow turbine supported by a flow turbine cage received within the tube, so that fluid within the tube flows over the flow turbine.

15. The faucet of claim 13, further comprising a circuit board supporting a detector, wherein the detector is configured to receive inputs from the flow sensor corresponding to a measured flow rate and transmit the inputs to operate the electrically operable valve.

16. The faucet of claim 12, further comprising a temperature sensor fluidly coupled with the electrically operable valve.

17. The faucet of claim 16, wherein the temperature sensor is communicatively coupled to a valve controller.

18. The faucet of claim 17, wherein the valve controller receives inputs from the temperature sensor to control the electrically operable valve in a manner that either maintains the temperature of a fluid below a predetermined temperature or maintain a flow of a fluid until the fluid reaches a predetermined temperature.

19. The faucet of claim 12, wherein the control module is in wireless communication with the input controller.

* * * * *